(12) United States Patent
Hu et al.

(10) Patent No.: US 12,732,973 B2
(45) Date of Patent: Sep. 8, 2026

(54) CONTROL INFORMATION SENDING METHOD, CONTROL INFORMATION RECEIVING METHOD, AND COMMUNICATION APPARATUS

(71) Applicant: HUAWEI TECHNOLOGIES CO., LTD., Shenzhen (CN)

(72) Inventors: Dan Hu, Beijing (CN); Xu Zhang, Beijing (CN); Zhiheng Guo, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 295 days.

(21) Appl. No.: 18/396,564

(22) Filed: Dec. 26, 2023

(65) Prior Publication Data

US 2024/0188050 A1 Jun. 6, 2024

Related U.S. Application Data

(63) Continuation of application No. PCT/CN2022/101823, filed on Jun. 28, 2022.

(30) Foreign Application Priority Data

Jun. 30, 2021 (CN) ........................ 202110745368.0

(51) Int. Cl.
*H04W 72/232* (2023.01)
*H04W 56/00* (2009.01)
(Continued)

(52) U.S. Cl.
CPC ... *H04W 72/0446* (2013.01); *H04W 56/0015* (2013.01); *H04W 72/0453* (2013.01); *H04W 72/232* (2023.01)

(58) Field of Classification Search
CPC ......... H04W 56/0015; H04W 72/0446; H04W 72/0453; H04W 72/232
See application file for complete search history.

(56) References Cited

U.S. PATENT DOCUMENTS

2019/0174474 A1* 6/2019 Zhang .................. H04W 72/30
2021/0227578 A1* 7/2021 Jiang .................. H04W 74/006

FOREIGN PATENT DOCUMENTS

CN 111510266 A 8/2020

OTHER PUBLICATIONS

Extended European Search Report in European Appln. No. 22832025.5, mailed on Oct. 8, 2024, 11 pages.

(Continued)

*Primary Examiner* — Sam Bhattacharya
(74) *Attorney, Agent, or Firm* — Fish & Richardson P.C.

(57) ABSTRACT

This application describes examples of a control information sending method, a control information receiving method, and a related communication apparatus. In one example, a terminal device receives first indication information before the terminal device being in a connected state. The first indication indicates a first time-frequency resource set, and the first time-frequency resource set and a second time-frequency resource set are used to transmit first control information. The terminal device receives the first control information on each of the first time-frequency resource set and the second time-frequency resource set before the terminal device being in the connected state.

20 Claims, 9 Drawing Sheets

(51) Int. Cl.
*H04W 72/0446* (2023.01)
*H04W 72/0453* (2023.01)

(56) References Cited

OTHER PUBLICATIONS

3GPP TS 38.211 V16.5.0 (Mar. 2021), 3rd Generation Partnership Project; Technical Specification Group Radio Access Network; NR; Physical channels and modulation (Release 16), Mar. 2021, 134 pages.
3GPP TR 38.830 V17.0.0 (Dec. 2020), 3rd Generation Partnership Project; Technical Specification Group Radio Access Network; Study on NR coverage enhancements (Release 17), Dec. 2020, 91 pages.
Qualcomm Incorporated, "Potential coverage enhancement techniques for other channels." 3GPP TSG-RAN WG1 Meeting #103 e-Meeting, R1-2009309, Oct. 26-Nov. 13, 2020, 5 pages.

* cited by examiner

CONTROL INFORMATION SENDING METHOD, CONTROL INFORMATION RECEIVING METHOD, AND COMMUNICATION APPARATUS

CROSS-REFERENCE TO RELATED APPLICATIONS

This application is a continuation of International Application No. PCT/CN2022/101823, filed on Jun. 28, 2022, which claims priority to Chinese Patent Application No. 202110745368.0, filed on Jun. 30, 2021. The disclosures of the aforementioned applications are hereby incorporated by reference in their entireties.

TECHNICAL FIELD

Embodiments of this application relate to the communication field, and in particular, to a control information sending method, a control information receiving method, and a communication apparatus.

BACKGROUND

A synchronization signal/broadcast channel block (SS/PBCH block, SSB) is defined in a new radio (NR) technology in a fifth generation mobile communication system (the fifth generation, 5G). One SSB includes a primary synchronization signal (PSS), a secondary synchronization signal (SSS), and a physical broadcast channel (PBCH).

Usually, in a process in which a terminal device accesses a network, the terminal device first receives an SSB sent by a network device. A PBCH in the SSB carries information indicating a time-frequency domain position of a time-frequency resource set to which a physical downlink control channel (PDCCH) belongs, and the PDCCH carries downlink control information (DCI) sent by the network device to the terminal device. Then, the terminal device receives the PDCCH according to an instruction of the PBCH, and obtains the DCI in the PDCCH.

However, in actual application, because there may be a relatively long distance between the terminal device and the network device, signal-to-noise ratios (SNR) of these terminal devices are extremely low. As a result, a terminal device that is relatively far away from a network device usually has relatively low accuracy of receiving the DCI.

SUMMARY

Embodiments of this application provide a control information sending (or receiving) method and a communication apparatus, to improve a probability of correctly receiving control information before being in a connected state.

According to a first aspect, this application provides a control information receiving method, and the method relates to a terminal device and a network device. The terminal device receives first indication information from the network device before entering a connected state. The first indication information indicates a first time-frequency resource set, and the first time-frequency resource set and a second time-frequency resource set are used to transmit first control information. Then, before being in the connected state, the terminal device receives the first control information sent by the network device on each of the first time-frequency resource set and the second time-frequency resource set.

The first time-frequency resource set and the second time-frequency resource set are time-frequency resources configured by the network device for transmitting the first control information. The first control information is carried in one or more time-frequency resources in the first time-frequency resource set. For ease of description, the first control information is carried in a first time-frequency resource in the first time-frequency resource set below. In other words, when the terminal device blindly detects the first time-frequency resource in the first time-frequency resource set, the terminal device can receive the first control information on the first time-frequency resource. Similarly, the first control information is also carried in one or more time-frequency resources in the second time-frequency resource set. For ease of description, the first control information is carried in a second time-frequency resource in the second time-frequency resource set below. In other words, when the terminal device blindly detects the second time-frequency resource in the second time-frequency resource set, the terminal device can receive the first control information on the second time-frequency resource. It should be understood that the first time-frequency resource may be one time-frequency resource, for example, one resource block RB or one resource element RE, or may be a plurality of time-frequency resources, for example, a plurality of resource blocks RBs or a plurality of resource elements REs. This is not specifically limited herein.

Optionally, the network device configures the time-frequency resource set for the terminal device or notifies the terminal device of a configuration status of a time-frequency resource set, by sending the indication information to the terminal device. For example, the network device sends the first indication information to the terminal device, to configure the first time-frequency resource set for the terminal device or notify the terminal device that the first time-frequency resource set is not configured for the terminal device. For another example, the network device sends second indication information to the terminal device, to configure the second time-frequency resource set for the terminal device.

In this implementation, before being in the connected state, the terminal device may receive the first indication information for indicating the first time-frequency resource set, and both the first time-frequency resource set and the second time-frequency resource set are used to transmit the first control information. Therefore, the terminal device may receive the first control information on each of the first time-frequency resource set and the second time-frequency resource set. In other words, the network device not only sends the first control information to the terminal device on the first time-frequency resource set, but also sends the first control information to the terminal device on the second time-frequency resource set. Therefore, the terminal device may receive the first control information on the first time-frequency resource set, or may receive the first control information on the second time-frequency resource set. In comparison with a conventional technology in which the terminal device in a non-connected state receives the first control information only on the second time-frequency resource set, the terminal device in the solution of this application may receive the first control information by using at least two time-frequency resource sets, and the terminal device can receive at least two pieces of first control information. Therefore, a probability of correctly receiving the first control information by the terminal device can be increased.

In an optional implementation, the first control information is used to schedule a system information block SIB 1; or the first control information is control information scrambled by a system information radio network temporary identifier SI-RNTI.

In this implementation, a type of the first control information is specified. Usually, different types of control information have different functions, and resources for scheduling are also different. In this implementation, it is proposed that the first control information is used to schedule the system information block SIB 1. In other words, the first control information sent by the network device to the terminal device indicates information related to the SIB 1 to the terminal device, instead of scheduling other information or resources. In addition, because the control information for scheduling the SIB 1 is usually control information scrambled by the SI-RNTI, the first control information may also be understood as control information scrambled by the SI-RNTI.

In an optional implementation, the first time-frequency resource belongs to the first time-frequency resource set, and the second time-frequency resource belongs to the second time-frequency resource set. Both a time domain position of the first time-frequency resource set and a time domain position of the second time-frequency resource set are related to an index value of a first synchronization signal block SSB, and both the first time-frequency resource set and the second time-frequency resource set are time-frequency resource sets that carry candidate sets of a control channel.

Optionally, an index value of an SSB used by the terminal device to determine the time domain position of the first time-frequency resource set is the same as an index value of an SSB used by the terminal device to determine the time domain position of the second time-frequency resource set. In other words, the terminal device separately determines the time domain position of the first time-frequency resource set and the time domain position of the second time-frequency resource set based on the index value of the first SSB.

In this implementation, it is proposed that when the terminal device determines the time domain position of the first time-frequency resource set and the time domain position of the second time-frequency resource set, the terminal device uses a same index value of the SSB (namely, the index value of the first SSB). This helps reduce signaling that is sent by the network device to the terminal device and that indicates the index value of the SSB, and also helps reduce complexity of obtaining, by the terminal device, the index value of the SSB for determining the first time-frequency resource.

It should be understood that when configuring a time-frequency resource for the terminal device, the network device indicates, to the terminal device, a time-frequency resource set including the time-frequency resource, and the terminal device monitors each time-frequency resource in the time-frequency resource set, so that the terminal device can receive the first control information on a time-frequency resource carrying the first control information. For example, the first indication information can directly or indirectly indicate a time-frequency domain position of the first time-frequency resource set in which the first time-frequency resource is located. The second indication information can directly indicate a time-frequency domain position of the second time-frequency resource set in which the second time-frequency resource is located.

In an optional implementation, the first indication information indicates the time domain position of the first time-frequency resource set. The method further includes: The terminal device determines the time domain position of the first time-frequency resource set based on the first indication information.

In this implementation, it is proposed that the first indication information can directly or indirectly indicate the time domain position of the first time-frequency resource set. Therefore, the terminal device may determine the time domain position of the first time-frequency resource set based on the first indication information. In this way, the terminal device monitors, on the first time-frequency resource set, each time-frequency resource in the first time-frequency resource set, so that the terminal device receives the first control information on the first time-frequency resource.

It should be understood that configuring, by the network device, the first time-frequency resource for the terminal device includes but is not limited to indicating, by the network device, the time-frequency domain position of the first time-frequency resource set (including the time domain position and/or a frequency domain position of the time-frequency resource set) to the terminal device. Optionally, the network device indicates the time-frequency domain position of the first time-frequency resource set to the terminal device in an explicit manner. For example, the first indication information sent by the network device to the terminal device can directly indicate the time-frequency domain position of the first time-frequency resource set, and the terminal device can determine the time-frequency domain position of the first time-frequency resource set without depending on other information sent by the network device to the terminal device. Optionally, the network device indicates the time-frequency domain position of the first time-frequency resource set to the terminal device in an implicit manner. For example, content indicated by the first indication information sent by the network device to the terminal device is related to another time-frequency resource set (for example, the second time-frequency resource set), so that the terminal device determines the time-frequency domain position of the first time-frequency resource set based on the another time-frequency resource set (for example, the second time-frequency resource set).

In an optional implementation, that the terminal device determines the time domain position of the first time-frequency resource set based on the first indication information includes: The terminal device determines the time domain position of the first time-frequency resource set based on the first indication information and the index value of the first synchronization signal block SSB. Both the time domain position of the first time-frequency resource set and the time domain position of the second time-frequency resource set are related to the index value of the first SSB.

In this implementation, it is proposed that both the time domain position of the first time-frequency resource set and the time domain position of the second time-frequency resource set are related to the index value of the first SSB. Therefore, the time domain position of the first time-frequency resource set is the same as or similar to the time domain position of the second time-frequency resource set. In this case, the time domain position of the first time-frequency resource in the first time-frequency resource set is also similar to the time domain position of the second time-frequency resource in the second time-frequency resource set. Therefore, the terminal device may receive the first control information from each of the first time-frequency resource in the first time-frequency resource set and the second time-frequency resource in the second time-frequency resource set within a relatively short time range (for example, one slot or two adjacent slots). That is, the terminal device may receive at least two pieces of first control information within the relatively short time range. Therefore, this helps reduce a delay of receiving the first control information by the terminal device, and also helps improve efficiency of successfully receiving the first control information by the terminal device.

In an optional implementation, the first indication information includes a first association relationship, and the first association relationship indicates an association relationship between the time domain position of the first time-frequency resource set and the time domain position of the second time-frequency resource set. That the terminal device determines the time domain position of the first time-frequency resource set based on the first indication information includes: The terminal device determines the time domain position of the first time-frequency resource set based on the first indication information and the time domain position of the second time-frequency resource set.

In this implementation, it is proposed that the network device indicates the time-frequency domain position of the first time-frequency resource to the terminal device in an implicit manner. Specifically, the first indication information provided by the network device for the terminal device includes the first association relationship, and the first association relationship indicates the association relationship between the time domain position of the first time-frequency resource set and the time domain position of the second time-frequency resource set. Therefore, if the terminal device can learn of the time domain position of the second time-frequency resource set, the terminal device may determine the time domain position of the first time-frequency resource set based on the first association relationship and the time domain position of the second time-frequency resource set. This helps the terminal device quickly determine the time domain position of the first time-frequency resource set, and reduces complexity of determining the time domain position of the first time-frequency resource set by the terminal device.

It should be understood that the time domain position of the second time-frequency resource is determined by the terminal device by using other indication information. For example, the network device sends the second indication information to the terminal device by using the conventional technology, and the second indication information can directly indicate the time-frequency domain position of the second time-frequency resource (including the time domain position of the second time-frequency resource) to the terminal device. Optionally, the terminal device first determines the time domain position of the second time-frequency resource based on the second indication information, and then determines the time domain position of the first time-frequency resource based on the first indication information.

In an optional implementation, the first indication information includes the first association relationship, and the first association relationship indicates the association relationship between the time domain position of the first time-frequency resource set and the time domain position of the second time-frequency resource set. That the terminal device determines the time domain position of the first time-frequency resource set based on the first indication information and the index value of the first synchronization signal block SSB includes: The terminal device determines the time domain position of the second time-frequency resource set based on the second indication information and the index value of the first SSB, where the second indication information indicates the time domain position of the second time-frequency resource set; and the terminal device determines the time domain position of the first time-frequency resource set based on the first indication information and the time domain position of the second time-frequency resource set.

In this implementation, it is proposed that the content indicated by the first indication information is related to the another time-frequency resource set (namely, the second time-frequency resource set). The terminal device first determines the time domain position of the second time-frequency resource set based on the second indication information and the index value of the first SSB, and then determines the time-frequency domain position of the first time-frequency resource set based on the first indication information and the time domain position of the second time-frequency resource set. In this process, the terminal device needs to query a reference table (for example, Table 13-11 or Table 13-12 in the 3GPP protocol) and perform calculation only in a process of determining the second time-frequency resource set. When determining the time domain position of the first time-frequency resource set, the terminal device may directly determine the time domain position of the first time-frequency resource set based on the time domain position of the second time-frequency resource set and the first association relationship, without looking up the table again to perform calculation. This helps reduce complexity of determining the time domain position of the first time-frequency resource by the terminal device, and helps the terminal device quickly determine the time domain position of the first time-frequency resource, thereby reducing a delay of determining the time domain position of the first time-frequency resource.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In this implementation, it is proposed that the first time-frequency resource set and the second time-frequency resource set are respectively located in the same slot in the time domain. In a process in which the terminal device monitors the control channel in the slot indicated by the time domain position of the second time-frequency resource set, the terminal device may receive at least two pieces of first control information in several consecutive symbols in the slot, and the terminal device does not need to additionally monitor a control channel in another slot (for example, a slot other than the time domain position of the second time-frequency resource set). This helps reduce a time required by the terminal device to obtain the first control information, and helps improve a success rate of receiving the first control information by the terminal device.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In this implementation, it is proposed that the first time-frequency resource set and the second time-frequency resource set are respectively located in the consecutive and different slots in the time domain. The terminal device may receive at least two pieces of first control information in the consecutive and different slots, and the terminal device does not need to monitor a control channel in inconsecutive slots (for example, a slot whose index value is 0 and a slot whose index value is 3). This helps the terminal device obtain the first control information in a relatively short time, and helps improve a success rate of receiving the first control information by the terminal device.

In an optional implementation, the slot in which the first time-frequency resource set is located is before the slot in which the second time-frequency resource set is located.

In this implementation, the slot is a concept in the time domain, and the slot in which the first time-frequency resource set is located is before the slot in which the second time-frequency resource set is located. This indicates that a time at which the network device may send the first control information to the terminal device on the first time-frequency resource set is earlier than a time at which the network device sends the first control information to the terminal device on the second time-frequency resource set. Therefore, in comparison with a solution in which the first control information is received only from the second time-frequency resource set, the terminal device may receive the first control information earlier. This helps shorten a time required by the terminal device to receive the first control information.

It should be noted that there are a plurality of other specific implementations in embodiments of this application. For details, refer to the specific implementations of the first aspect and beneficial effects of the first aspect. Details are not described herein again.

According to a second aspect, this application provides a control information receiving method, and the method relates to a terminal device and a network device. The terminal device receives first indication information before being in a connected state, where the first indication information indicates whether repeated transmission of first control information exists. When the first indication information indicates that repeated transmission of the first control information exists, the terminal device determines a time domain position of a first time-frequency resource set and a time domain position of a second time-frequency resource set based on a first table. The terminal device receives the first control information on each of the first time-frequency resource set and the second time-frequency resource set before being in the connected state.

The first indication information indicates whether repeated transmission of the first control information exists. It may also be understood that the first indication information indicates whether the first control information needs to be repeatedly transmitted. It may also be understood that the first indication information indicates whether a time domain resource set (for example, the first time-frequency resource set) for repeatedly transmitting the first control information exists. It may also be understood that the first indication information indicates whether a time domain resource (for example, a first time-frequency resource in the first time-frequency resource set) for repeatedly transmitting the first control information exists. This is not specifically limited herein.

Optionally, the terminal device determines the time domain position of the first time-frequency resource set and the time domain position of the second time-frequency resource set based on a row in the first table. In other words, after the terminal device determines, based on a piece of indication information, an index value used for table lookup, the terminal device may determine a row of parameters in the first table based on the index value, and the terminal device may determine the time domain position of the first time-frequency resource set and the time domain position of the second time-frequency resource set based on the row of parameters in the first table without querying another row of parameters in the first table.

In this implementation, before being in the connected state, the terminal device may receive the first indication information for indicating whether to repeatedly transmit the first control information. When the first indication information indicates that the first control information needs to be repeatedly transmitted, the terminal device queries a newly defined table (namely, the first table), and the terminal device can determine, based on the first table, two time-frequency resource sets (namely, the first time-frequency resource set and the second time-frequency resource set) for transmitting the first control information. Then, the terminal device receives the first control information on the first time-frequency resource set and the second time-frequency resource set. In other words, the network device not only sends the first control information to the terminal device on the first time-frequency resource set, but also sends the first control information to the terminal device on the second time-frequency resource set. Therefore, the terminal device may receive the first control information on the first time-frequency resource set, or may receive the first control information on the second time-frequency resource set. In comparison with a conventional technology in which the terminal device in a non-connected state receives the first control information only on the second time-frequency resource set, the terminal device in the solution of this application may receive the first control information by using at least two time-frequency resource sets, and the terminal device can receive at least two pieces of first control information. Therefore, a probability of correctly receiving the first control information by the terminal device can be increased.

In an optional implementation, the first control information is used to schedule a system information block SIB 1; or the first control information is control information scrambled by a system information radio network temporary identifier SI-RNTI.

In this implementation, a type of the first control information is specified. Usually, different types of control information have different functions, and resources for scheduling are also different. In this implementation, it is proposed that the first control information is used to schedule the system information block SIB 1. In other words, the first control information sent by the network device to the terminal device indicates information related to the SIB 1 to the terminal device, instead of scheduling other information or resources. In addition, because the control information for scheduling the SIB 1 is usually control information scrambled by the SI-RNTI, the first control information may also be understood as control information scrambled by the SI-RNTI.

In an optional implementation, the first indication information is located in a first message, the first message further includes a master information block MIB carrying second indication information, and the second indication information indicates the time domain position of the second time-frequency resource set. That the terminal device determines a time domain position of a first time-frequency resource set and a time domain position of a second time-frequency resource set based on a first table includes: The terminal device determines the time domain position of the first time-frequency resource set and the time domain position of the second time-frequency resource set based on the second indication information, an index value of a first synchronization signal block SSB, and the first table.

In an optional implementation, the first table includes an index value of a first symbol in a monitoring window of the first time-frequency resource set and an index value of a first symbol in a monitoring window of the second time-frequency resource set.

In an optional implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

Optionally, the terminal device determines the first index value based on the second indication information, where the first index value is used to query the index value of the first symbol in the monitoring window of the first time-frequency resource set in the first table and the index value of the first symbol in the monitoring window of the second time-frequency resource set in the first table. The first index value corresponds to the index value of the first symbol in the monitoring window of the first time-frequency resource set, and the first index value corresponds to the index value of the first symbol in the monitoring window of the second time-frequency resource set. The terminal device determines the index value of the first symbol in the monitoring window of the first time-frequency resource set and the index value of the first symbol in the monitoring window of the second time-frequency resource set based on the first index value and the first table.

In this embodiment, the terminal device may obtain two index values (namely, the index value of the first symbol in the monitoring window of the first time-frequency resource set and the index value of the first symbol in the monitoring window of the second time-frequency resource set) about the first symbol in one table lookup operation by querying the first table based on the first index value. However, in the conventional technology, only one index value of the first symbol (namely, the index value of the first symbol in the monitoring window of the second time-frequency resource set) can be found based on the first index value determined based on the second indication information. Therefore, the solution provided in this embodiment helps reduce a quantity of times that the terminal device queries a reference table, and helps the terminal device quickly determine the time domain position of the first time-frequency resource set and the time domain position of the second time-frequency resource set.

In an optional implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 &$N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

According to a third aspect, this application provides a control information sending method, and the method relates to a terminal device and a network device. The network device sends first indication information, where the first indication information indicates a first time-frequency resource set, and the first time-frequency resource set and a second time-frequency resource set are used to transmit first control information to the terminal device in a non-connected state. The network device sends the first control information on each of the first time-frequency resource set and the second time-frequency resource set.

In an optional implementation, the first control information is used to schedule a system information block SIB 1; or the first control information is control information scrambled by a system information radio network temporary identifier SI-RNTI.

In an optional implementation, the first indication information indicates a time domain position of the first time-frequency resource set.

In an optional implementation, the first indication information and an index value of a first synchronization signal block SSB are used to determine the time domain position of the first time-frequency resource set, and both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set. The method further includes: The network device sends second indication information. The second indication information indicates the time domain position of the second time-frequency resource set, the second indication information and the index value of the first SSB are used to determine the time domain position of the second time-frequency resource set, and the first indication information and the time domain position of the second time-frequency resource set are used to determine the time domain position of the first time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

It should be noted that there are a plurality of other specific implementations in embodiments of this application. For details, refer to the specific implementations of the first aspect and beneficial effects of the first aspect. Details are not described herein again.

According to a fourth aspect, this application provides a control information sending method, and the method relates to a terminal device and a network device. The network device sends first indication information, where the first indication information indicates whether repeated transmission of first control information exists. When the first indication information indicates that repeated transmission of the first control information exists, the network device sends the first control information on each of a first time-frequency resource set and a second time-frequency resource set, where a time domain position of the first time-frequency resource set and a time domain position of the second time-frequency resource set are determined based on a first table.

In an optional implementation, the first control information is used to schedule a system information block SIB 1; or the first control information is control information scrambled by a system information radio network temporary identifier SI-RNTI.

In an optional implementation, the first indication information is located in a first message, the first message further includes a master information block MIB carrying second indication information, and the second indication information indicates the time domain position of the second time-frequency resource set. The second indication information, an index value of a first synchronization signal block SSB, and the first table are used to determine the time domain position of the first time-frequency resource set and the time domain position of the second time-frequency resource set.

In an optional implementation, the first table includes an index value of a first symbol in a monitoring window of the first time-frequency resource set and an index value of a first symbol in a monitoring window of the second time-frequency resource set.

In an optional implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In an optional implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 & $N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

It should be noted that there are a plurality of other specific implementations in embodiments of this application. For details, refer to the specific implementations of the second aspect and beneficial effects of the second aspect. Details are not described herein again.

According to a fifth aspect, this application provides a terminal device. The terminal device includes:

a receiving module, configured to receive first indication information before being in a connected state, where the first indication information indicates a first time-frequency resource set, and the first time-frequency resource set and a second time-frequency resource set are used to transmit first control information.

The receiving module is further configured to receive the first control information on each of the first time-frequency resource set and the second time-frequency resource set before being in the connected state.

In an optional implementation, the first control information is used to schedule a system information block SIB 1; or the first control information is control information scrambled by a system information radio network temporary identifier SI-RNTI.

In an optional implementation, the first indication information indicates a time domain position of the first time-frequency resource set. The terminal device further includes a processing module, configured to determine the time domain position of the first time-frequency resource set based on the first indication information.

In an optional implementation, the processing module is specifically configured to determine the time domain position of the first time-frequency resource set based on the first indication information and an index value of a first synchronization signal block SSB, where both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set.

The processing module is specifically configured to: determine the time domain position of the second time-frequency resource set based on second indication information and the index value of the first SSB, where the second indication information indicates the time domain position of the second time-frequency resource set; and determine the time domain position of the first time-frequency resource set based on the first indication information and the time domain position of the second time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

It should be noted that there are a plurality of other specific implementations in embodiments of this application. For details, refer to the specific implementations of the first aspect and beneficial effects of the first aspect. Details are not described herein again.

According to a sixth aspect, this application provides a terminal device. The terminal device includes a receiving module and a processing module. The receiving module is configured to receive first indication information before being in a connected state, where the first indication information indicates whether repeated transmission of first control information exists. The processing module is configured to: when the first indication information indicates that repeated transmission of the first control information exists, determine a time domain position of a first time-frequency resource set and a time domain position of a second time-frequency resource set based on a first table. The receiving module is further configured to receive the first control information on each of the first time-frequency resource set and the second time-frequency resource set before being in the connected state.

In an optional implementation, the first control information is used to schedule a system information block SIB 1; or the first control information is control information scrambled by a system information radio network temporary identifier SI-RNTI.

In an optional implementation, the first indication information is located in a first message, the first message further includes a master information block MIB carrying second indication information, and the second indication information indicates the time domain position of the second time-frequency resource set.

The processing module is specifically configured to determine the time domain position of the first time-frequency resource set and the time domain position of the second time-frequency resource set based on the second indication information, an index value of a first synchronization signal block SSB, and the first table.

In an optional implementation, the first table includes an index value of a first symbol in a monitoring window of the first time-frequency resource set and an index value of a first symbol in a monitoring window of the second time-frequency resource set.

In an optional implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In an optional implementation, the first table includes:

| First index value determined based on the second indication information | O | Quantity of slots in each search space set | M | Index value of the first symbol in the monitoring window |
|---|---|---|---|---|
| 0 | 0 | 1 | 1 | $0\ \&N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

It should be noted that there are a plurality of other specific implementations in embodiments of this application. For details, refer to the specific implementations of the second aspect and beneficial effects of the second aspect. Details are not described herein again.

According to a seventh aspect, this application provides a network device, and the network device includes:

a sending module, configured to send first indication information, where the first indication information indicates a first time-frequency resource set, and the first time-frequency resource set and a second time-frequency resource set are used to transmit first control information to a terminal device in a non-connected state.

The sending module is further configured to send the first control information on each of the first time-frequency resource set and the second time-frequency resource set.

In an optional implementation, the first control information is used to schedule a system information block SIB 1; or the first control information is control information scrambled by a system information radio network temporary identifier SI-RNTI.

In an optional implementation, the first indication information indicates a time domain position of the first time-frequency resource set.

In an optional implementation, the first indication information and an index value of a first synchronization signal block SSB are used to determine the time domain position of the first time-frequency resource set, and both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set.

The sending module is further configured to send second indication information, where the second indication information indicates the time domain position of the second time-frequency resource set, the second indication information and the index value of the first SSB are used to determine the time domain position of the second time-frequency resource set, and the first indication information and the time domain position of the second time-frequency resource set are used to determine the time domain position of the first time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

It should be noted that there are a plurality of other specific implementations in embodiments of this application. For details, refer to the specific implementations of the first aspect and beneficial effects of the first aspect. Details are not described herein again.

According to an eighth aspect, this application provides a network device, and the network device includes:

- a sending module, configured to send first indication information, where the first indication information indicates whether repeated transmission of first control information exists.

The sending module is further configured to: when the first indication information indicates that repeated transmission of the first control information exists, send the first control information on each of a first time-frequency resource set and a second time-frequency resource set, where a time domain position of the first time-frequency resource set and a time domain position of the second time-frequency resource set are determined based on a first table.

In an optional implementation, the first control information is used to schedule a system information block SIB 1; or the first control information is control information scrambled by a system information radio network temporary identifier SI-RNTI.

In an optional implementation, the first indication information is located in a first message, the first message further includes a master information block MIB carrying second indication information, and the second indication information indicates the time domain position of the second time-frequency resource set. The second indication information, an index value of a first synchronization signal block SSB, and the first table are used to determine the time domain position of the first time-frequency resource set and the time domain position of the second time-frequency resource set.

In an optional implementation, the first table includes an index value of a first symbol in a monitoring window of the first time-frequency resource set and an index value of a first symbol in a monitoring window of the second time-frequency resource set.

In an optional implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In an optional implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 & $N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

It should be noted that there are a plurality of other specific implementations in embodiments of this application. For details, refer to the specific implementations of the second aspect and beneficial effects of the second aspect. Details are not described herein again.

According to a ninth aspect, an embodiment of this application provides a communication apparatus. The communication apparatus may be the terminal device in the foregoing implementations, or may be a chip in the terminal device. The communication apparatus may include a processing module and a transceiver module. When the communication apparatus is the terminal device, the processing module may be a processor, and the transceiver module may be a transceiver. The terminal device may further include a storage module, and the storage module may be a memory. The storage module is configured to store instructions, and the processing module executes the instructions stored in the storage module, so that the terminal device performs the method in any one of the first aspect or the implementations of the first aspect, or the method in any one of the second aspect or the implementations of the second aspect. When the communication apparatus is the chip in the terminal device, the processing module may be the processor, and the transceiver module may be an input/output interface, a pin, a circuit, or the like. The processing module executes the instructions stored in the storage module, so that the terminal device performs the method in any one of the first aspect or the implementations of the first aspect, or the method in any one of the second aspect or the implementations of the second aspect. The storage module may be a storage module (for example, a register or a cache) in the chip, or may be a storage module (for example, a read-only memory or a random access memory) that is in the terminal device and that is located outside the chip.

According to a tenth aspect, an embodiment of this application provides a communication apparatus. The communication apparatus may be the network device in the foregoing implementations, or may be a chip in the network device. The communication apparatus may include a processing module and a transceiver module. When the communication apparatus is the network device, the processing module may be a processor, and the transceiver module may be a transceiver. The network device may further include a storage module, and the storage module may be a memory. The storage module is configured to store instructions, and the processing module executes the instructions stored in the storage module, so that the network device performs the method in any one of the third aspect or the implementations of the third aspect, or the method in any one of the fourth aspect or the implementations of the fourth aspect. When the communication apparatus is the chip in the network device, the processing module may be the processor, and the transceiver module may be an input/output interface, a pin, a circuit, or the like. The processing module executes the instructions stored in the storage module, so that the network device performs the method in any one of the third aspect or the implementations of the third aspect, or the method in any one of the fourth aspect or the implementations of the fourth aspect. The storage module may be a storage module (for example, a register or a cache) in the chip, or may be a storage module (for example, a read-only memory or a random access memory) that is in the network device and that is located outside the chip.

According to an eleventh aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method in any one of the first aspect or the implementations of the first aspect, or the method in any one of the second aspect or the implementations of the second aspect.

According to a twelfth aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method in any one of the third aspect or the implementations of the third aspect, or the method in any one of the fourth aspect or the implementations of the fourth aspect.

According to a thirteenth aspect, an embodiment of this application provides a computer program product including instructions. When the computer program product runs on a computer, the computer is enabled to perform the method in any one of the first aspect, the second aspect, the third aspect, the fourth aspect, or the implementations of the foregoing aspects.

According to a fourteenth aspect, an embodiment of this application provides a computer-readable storage medium including instructions. When the instructions are run on a computer, the computer is enabled to perform the method in any one of the first aspect, the second aspect, the third aspect, the fourth aspect, or the implementations of the foregoing aspects.

According to a fifteenth aspect, an embodiment of this application provides a communication system. The communication system includes the terminal device in any one of the first aspect and the implementations of the first aspect, and the network device in any one of the third aspect and the implementations of the third aspect. Alternatively, the communication system includes the terminal device in any one of the second aspect and the implementations of the second aspect, and the network device in any one of the fourth aspect and the implementations of the fourth aspect.

BRIEF DESCRIPTION OF DRAWINGS

To describe the technical solutions in embodiments of this application more clearly, the following briefly describes the accompanying drawings required for describing embodiments. Apparently, the accompanying drawings in the following description show merely some embodiments of this application.

FIG. 3 is another flowchart of a control information sending (or receiving) method according to this application;

FIG. 5 is another flowchart of a control information sending (or receiving) method according to this application;

DESCRIPTION OF EMBODIMENTS

Figures 1, 2A:
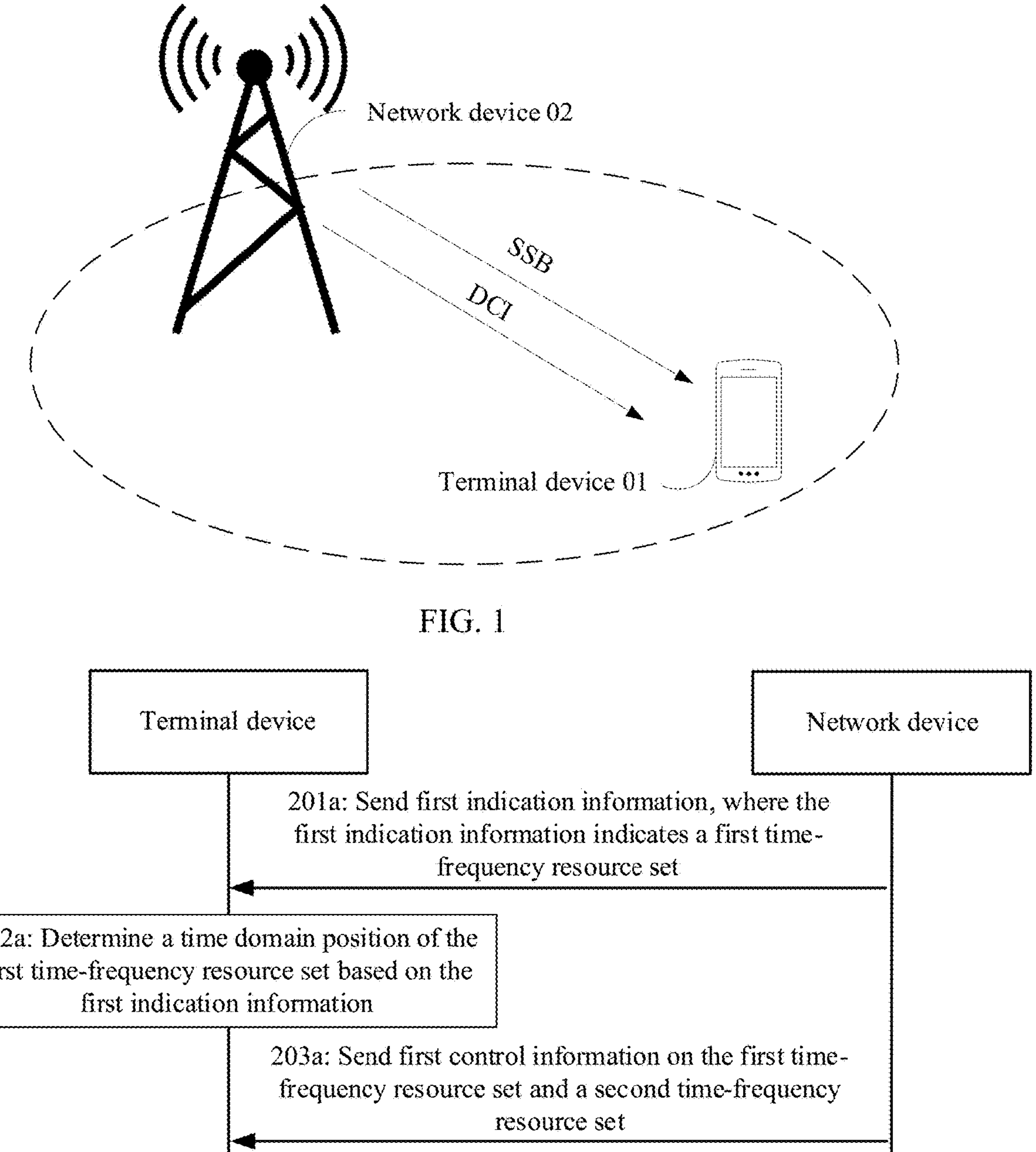
FIG. 1 is a schematic diagram of a scenario to which a control information sending (or receiving) method is applicable according to this application.
FIG. 2A is a flowchart of a control information sending (or receiving) method according to this application.

The following clearly describes the technical solutions in the embodiments of this application with reference to the accompanying drawings in the embodiments of this application. Apparently, the described embodiments are only a part rather than all of the embodiments of this application.

In this specification, claims, and accompanying drawings of this application, the terms "first", "second", "third", "fourth", and the like (if existent) are intended to distinguish between similar objects but do not necessarily indicate a specific order or sequence. It should be understood that the terms used in such a way are interchangeable in proper circumstances, so that embodiments described herein can be implemented in an order other than the order illustrated or described herein. In addition, the terms "including", "having", and any variations thereof, are intended to cover a non-exclusive inclusion, for example, a process, method, system, product, or device including a series of steps or units is not necessarily limited to those steps or units explicitly listed, and may include other steps or units not explicitly listed or inherent to the process, method, product, or device.

For ease of understanding, the following first describes some terms used in embodiments of this application.

Time-frequency resource: a physical resource that carries a channel. Usually, the time-frequency resource may be represented by a resource block (RB) and a resource element (RE) based on different division granularities. One RB occupies one symbol (for example, an orthogonal frequency division multiplexing (OFDM) symbol) in time domain, and occupies 12 subcarriers in frequency domain. One RE occupies one symbol in time domain, and occupies one subcarrier in frequency domain. One RB includes 12 REs.

Control resource set (CORESET): a set of time-frequency resources that carry a control channel (for example, a PDCCH). Usually, a basic component unit of the CORESET is a resource element group (REG), and one REG corresponds to one PRB on one OFDM symbol. A quantity of REGs included in a CORESET is usually an integer multiple of 6.

Search space (SS): a set of candidate control channels. Usually, a set of candidate control channels at a given aggregation level is defined as a search space. Therefore, a search space set may be a set of search spaces including a plurality of different aggregation levels.

Control channel element (CCE): The control channel element may include a plurality of resource element groups (REGs). For example, one REG includes one RB (that is, 12 REs). Usually, different CCEs include different quantities of REGs.

Demodulation reference signal (DMRS): a reference signal used for control channel demodulation and/or a reference signal used for data channel demodulation in a conventional technology. Optionally, demodulation may include at least one of channel estimation, demodulation, and decoding.

Radio network temporary identifier (RNTI): used to identify a terminal device. For example, in actual application, the radio network temporary identifier may be used as a mask to scramble a cyclic redundancy check (CRC) bit sequence obtained based on a downlink control information (DCI) payload. A value of the RNTI may be predefined in a standard or configured by using higher layer signaling. Optionally, different RNTIs may also be used to distinguish between different DCI functions. For example, DCI scrambled by using different RNTI values may be used to indicate time domain and/or frequency domain resources of physical downlink shared channels (PDSCH) of different data types. For example, DCI scrambled by using SI-RNTI is used to schedule a PDSCH carrying system information, and DCI scrambled by using C-RNTI is used to schedule a PDSCH dedicated to the terminal device.

The following first describes a system architecture and an application scenario that are adapted to a control information sending (or receiving) method provided in this application.

The control information sending (or receiving) method provided in this application may be applied to a 5G NR system, a sixth generation mobile information technology (the 6th generation mobile communication technology, 6G) system, and a subsequent evolved standard. This is not limited in this application.

As shown in FIG. 1, the system includes a terminal device 01 and a network device 02. In a process in which the terminal device 01 accesses a network, the terminal device 01 first receives an SSB sent by the network device 02. A PBCH in the SSB carries information indicating a time-frequency domain position of a time-frequency resource set to which a physical downlink control channel (PDCCH) belongs, and the PDCCH carries downlink control information (DCI) sent by the network device 02 to the terminal device 01. Then, the terminal device 01 receives the PDCCH according to an instruction of the PBCH, and obtains the DCI in the PDCCH.

In a conventional technology, the network device 02 may send, to the terminal device 01, indication information indicating a time-frequency domain position of a control resource set. Then, the terminal device 01 determines, based on the indication information and other information, a time-frequency domain position of a time-frequency resource for monitoring a control channel (for example, a downlink control channel PDCCH), so that the terminal device 01 receives control information (for example, downlink control information DCI) on the time-frequency resource of the control channel. In this process, the network device 02 sends the control information to the terminal device 01 only once, and does not repeatedly send the control information to the terminal device 01. If the terminal device 01 does not correctly receive the control information, a subsequent operation of the terminal device 01 is affected. For example, demodulation of a data channel by the terminal device 01 based on the control information is affected.

For this reason, embodiments of this application provide a control information sending (or receiving) method and a related communication apparatus. A time-frequency resource for repeatedly sending control information is added, so that the terminal device can receive control information on at least two time-frequency resources. That is, the terminal device can receive at least two pieces of control information. Because the network device increases a time-frequency resource for sending the control information to the terminal device, a quantity of pieces of control information that may be received by the terminal device is increased. Therefore, a probability of correctly receiving the control information by the terminal device can be increased. Specifically, the following describes in detail embodiments corresponding to FIG. 2A and FIG. 2B.

It should be noted that the terminal device in this application includes a device that provides voice and/or data connectivity for a user. For example, the terminal device may include a handheld device having a wireless connection function, or a processing device connected to a wireless modem. The terminal device may communicate with a core network (for example, a 5G core network (5th generation core, 5GC)) by using a radio access network (RAN), and may exchange voice and/or data with a RAN. The terminal device may also be referred to as a terminal, user equipment (UE), a wireless terminal device, a mobile terminal (MT) device, a subscriber unit, a subscriber station, a mobile station (MS), a mobile, a remote station, an access point (AP), a remote terminal device, an access terminal device, a user terminal device, a user agent, a user device, or the like. In addition, the terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. A specific technology and a specific device form used by the terminal device are not limited in this embodiment of this application.

It should be understood that the terminal device in embodiments of this application may be any one of the devices or a chip. This is not specifically limited herein. Regardless of being a device or a chip, the terminal device can be manufactured, sold, or used as an independent product. In this embodiment and subsequent embodiments, only the terminal device is used as an example for description.

In addition, the network device in this application may be any device that has a radio transceiver function, and may be configured to be responsible for functions related to an air interface, for example, a radio link maintenance function, a radio resource management function, and some mobility management functions. The radio link maintenance function is used to maintain a radio link with the terminal device, and is responsible for protocol conversion between radio link data and internet protocol (IP) data. The radio resource management function may include functions such as radio link establishment and release, radio resource scheduling and allocation, and the like. Some mobility management functions may include configuring the terminal device to perform measurement, evaluating radio link quality of the terminal device, and making decisions on handover of the terminal device between cells, and the like. For example, the network device may be an access network device (RAN) that currently provides a service for the terminal device. For example, the network device may include a next generation NodeB (gNB) in a 5G new radio (NR) system, or may include a central unit (CU) and a distributed unit (DU) in a cloud access network (CloudRAN) system. The network device may further include a node (for example, an xNodeB) in a 6G system. This is not specifically limited herein.

It should be understood that the access network device in embodiments of this application may be any one of the devices or a chip in the devices. This is not specifically limited herein. Regardless of being a device or a chip, the network device may be manufactured, sold, or used as an independent product. In this embodiment and subsequent embodiments, only the network device is used as an example for description.

With reference to FIG. 2A, the following describes a main procedure of a control information sending (or receiving) method provided in this application. In this method, before a terminal device enters a connected state, the terminal device and a network device may perform the following steps:

Step 201*a*: The network device sends first indication information to the terminal device; and correspondingly, the terminal device receives the first indication information from the network device.

The first indication information indicates a first time-frequency resource set, and the first time-frequency resource set is used to transmit first control information. Optionally, the first control information is control information for scheduling a system information block SIB 1; or the first control information is control information scrambled by a system information radio network temporary identifier SI-RNTI.

That the first time-frequency resource set is used to transmit first control information may be understood as that the first time-frequency resource set includes a plurality of time-frequency resources, and a first time-frequency resource in the plurality of time-frequency resources carries a control channel (for example, a downlink control channel PDCCH) for transmitting the first control information. The first time-frequency resource may be one time-frequency resource, for example, one resource block RB or one resource element RE. Alternatively, the first time-frequency resource may be a plurality of time-frequency resources, for example, a plurality of resource blocks RBs or a plurality of resource elements REs. This is not specifically limited herein.

In addition, the network device further configures a second time-frequency resource set for the terminal device according to a conventional technology, and the second time-frequency resource set is also a time-frequency resource for transmitting the first control information. It may also be understood that the second time-frequency resource set includes a plurality of time-frequency resources, and one of the plurality of time-frequency resources (referred to as a second time-frequency resource below) carries a control channel (for example, a downlink control channel PDCCH) for transmitting the first control information. Therefore, in this embodiment, the first time-frequency resource set may be understood as a time-frequency resource set that is additionally indicated by the network device to the terminal device and that is used to repeatedly transmit the first control information. The terminal device may receive the first control information on the first time-frequency resource in the first time-frequency resource set, or may receive the first control information on the second time-frequency resource in the second time-frequency resource set.

In this embodiment, the first indication information may have a plurality of implementations.

In an optional implementation, the first indication information can indirectly indicate a time domain position of the first time-frequency resource set.

In this implementation, the first indication information may include a first association relationship, and the first association relationship indicates an association relationship between the time domain position of the first time-frequency resource set and a time domain position of the second time-frequency resource set. In other words, the first indication information can indirectly indicate the time domain position of the first time-frequency resource set by indicating the association relationship between the time domain position of the first time-frequency resource set and a time domain position of another time-frequency resource set (for example, the time domain position of the second time-frequency resource set). If the terminal device can learn of the time domain position of the second time-frequency resource set, the terminal device may determine the time domain position of the first time-frequency resource set based on the first association relationship and the time domain position of the second time-frequency resource set.

In this implementation, the terminal device may preliminarily determine the time-frequency domain position of the first time-frequency resource set based on the first indication information, thereby narrowing a range in which the terminal device monitors the control information, and helping reduce load of the terminal device.

In another optional implementation, the first indication information can directly indicate the time domain position of the first time-frequency resource set.

In this implementation, the first indication information does not include the first association relationship, but directly indicates the time domain position of the first time-frequency resource set. In this case, the terminal device does not need to first determine the time domain position of the second time-frequency resource set and then determine the time domain position of the first time-frequency resource set. In this case, the terminal device determines the time domain position of the first time-frequency resource set based on the first indication information and an index value of a first SSB. Specifically, a manner in which the terminal device determines the time domain position of the first time-frequency resource set is similar to a manner in which the terminal device determines the time domain position of the second time-frequency resource based on the second indication information and the index value of the first SSB in the conventional technology. For details, refer to related descriptions in the following step 302*a*. Details are not described herein again.

In addition, the first association relationship may have the following plurality of implementations.

In an optional implementation, the first time-frequency resource set and the second time-frequency resource set are located in a same slot in time domain. Optionally, the first time-frequency resource set and the second time-frequency resource set are respectively located on consecutive and different symbols in the slot in the time domain. The consecutive and different symbols represent two adjacent symbols, or two symbols with consecutive index values.

In this implementation, it is proposed that the first time-frequency resource set and the second time-frequency resource set are respectively located in the same slot in the time domain. In a process in which the terminal device monitors the control channel in the slot indicated by the time domain position of the second time-frequency resource set, the terminal device may receive at least two pieces of first control information in several consecutive symbols in the slot, and the terminal device does not need to additionally monitor a control channel in another slot (for example, a slot other than the time domain position of the second time-frequency resource set). This helps reduce a time required by the terminal device to obtain the first control information, and helps improve a success rate of receiving the first control information by the terminal device.

In another optional implementation, the first time-frequency resource set and the second time-frequency resource set are respectively located in different slots in time domain. Optionally, a slot in which the first time-frequency resource set is located is adjacent to a slot in which the second time-frequency resource set is located. That is, an index value of the slot in which the first time-frequency resource set is located is consecutive to an index value of the slot in which the second time-frequency resource set is located. Optionally, an index value of a symbol in a slot in which the first time-frequency resource set is located is the same as an index value of a symbol in a slot in which the second time-frequency resource set is located.

In this implementation, it is proposed that the first time-frequency resource set and the second time-frequency resource set are respectively located in the consecutive and different slots in the time domain. The terminal device may receive at least two pieces of first control information in the consecutive and different slots, and the terminal device does not need to monitor a control channel in inconsecutive slots (for example, a slot whose index value is 0 and a slot whose index value is 3). This helps the terminal device obtain the first control information in a relatively short time, and helps improve a success rate of receiving the first control information by the terminal device.

Optionally, the slot in which the first time-frequency resource set is located is before the slot in which the second time-frequency resource set is located.

In this implementation, the slot is a concept in the time domain, and the slot in which the first time-frequency resource set is located is before the slot in which the second time-frequency resource set is located. This indicates that a time at which the network device may send the first control information to the terminal device on the first time-frequency resource set is earlier than a time at which the network device sends the first control information to the terminal device on the second time-frequency resource set. Therefore, in comparison with a solution in which the first control information is received only from the second time-frequency resource set, the terminal device may receive the first control information earlier. This helps shorten a time required by the terminal device to receive the first control information.

Step 202*a*: The terminal device determines the time domain position of the first time-frequency resource set based on the first indication information.

Specifically, the terminal device determines the time domain position of the first time-frequency resource set based on the first indication information and the index value of the first synchronization signal block SSB, and both the time domain position of the first time-frequency resource set and the time domain position of the second time-frequency resource set are related to the index value of the first SSB. Because both the time domain position of the first time-frequency resource set and the time domain position of the second time-frequency resource set are related to the index value of the first SSB, the time domain position of the first time-frequency resource set is the same as or similar to the time domain position of the second time-frequency resource set. In this case, the time domain position of the first time-frequency resource in the first time-frequency resource set is also similar to the time domain position of the second time-frequency resource in the second time-frequency resource set. Therefore, the terminal device may receive the first control information from each of the first time-frequency resource in the first time-frequency resource set and the second time-frequency resource in the second time-frequency resource set within a relatively short time range (for example, one slot or two adjacent slots). That is, the terminal device may receive at least two pieces of first control information within the relatively short time range. Therefore, this helps reduce a delay of receiving the first control information by the terminal device, and also helps improve efficiency of successfully receiving the first control information by the terminal device.

In an optional implementation, the first indication information includes the first association relationship. In this case, the terminal device first determines the time domain position of the second time-frequency resource set, and then determines the time domain position of the first time-frequency resource set based on the time domain position of the second time-frequency resource set and the first association relationship.

Optionally, the terminal device first determines the time domain position of the second time-frequency resource set based on the second indication information and the index value of the first SSB, and then the terminal device determines the time domain position of the first time-frequency resource set based on the first indication information and the time domain position of the second time-frequency resource set. The second indication information indicates a time domain position of the second time-frequency resource set.

In this implementation, the terminal device needs to query a reference table (for example, Table 13-11 or Table 13-12 in the 3GPP protocol) and perform calculation only in a process of determining the second time-frequency resource set. When determining the time domain position of the first time-frequency resource set, the terminal device may directly determine the time domain position of the first time-frequency resource set based on the time domain position of the second time-frequency resource set and the first association relationship, without looking up the table again to perform calculation. This helps reduce complexity of determining the time domain position of the first time-frequency resource by the terminal device, and helps the terminal device quickly determine the time domain position of the first time-frequency resource, thereby reducing a delay of determining the time domain position of the first time-frequency resource.

In another optional implementation, the first indication information does not include the first association relationship. In this case, the terminal device determines the time domain position of the first time-frequency resource set based on the first indication information and an index value of a first SSB.

It should be understood that, in actual application, the terminal device may determine the time domain position of the first time-frequency resource set in any one of the foregoing implementations.

Step 203*a*: The network device sends the first control information to the terminal device on each of the first time-frequency resource set and the second time-frequency resource set; and correspondingly, the terminal device receives the first control information on each of the first time-frequency resource set and the second time-frequency resource set.

Specifically, after the terminal device determines the time domain position of the second time-frequency resource set, because the second time-frequency resource set includes a plurality of time-frequency resources, the terminal device monitors a control channel at a position of each of the plurality of time-frequency resources, to receive, on the second time-frequency resource, the first control information sent by the network device.

Specifically, after the terminal device determines the time domain position of the first time-frequency resource set, because the first time-frequency resource set includes a plurality of time-frequency resources, the terminal device monitors a control channel at a position of each of the plurality of time-frequency resources, to receive, on the first time-frequency resource, the first control information sent by the network device.

It should be understood that the time domain position of the first time-frequency resource may be before the time domain position of the second time-frequency resource, or the time domain position of the second time-frequency resource may be before the time domain position of the first time-frequency resource. Therefore, the terminal device may first receive the first control information on the first time-frequency resource in the first time-frequency resource set, and then receive the repeated first control information on the second time-frequency resource in the second time-frequency resource set. Alternatively, the terminal device may first receive the first control information on the second time-frequency resource in the second time-frequency resource set, and then receive the repeated first control information on the first time-frequency resource in the first time-frequency resource set. This is not specifically limited herein.

In this embodiment, the network device indicates another time-frequency resource set (namely, the first time-frequency resource set) other than the second time-frequency resource set to the terminal device by using the first indication information. In addition, both the first time-frequency resource set and the second time-frequency resource set may be used to transmit the first control information. Therefore, the terminal device may receive two pieces of first control information on different time-frequency resources in different time-frequency resource sets. In comparison with the conventional technology, the terminal device in the conventional technology can receive one piece of first control information only from the second time-frequency resource in the second time-frequency resource set. Therefore, the solution provided in this embodiment can effectively improve a probability of correctly receiving the first control information by the terminal device.

Figure 2B:
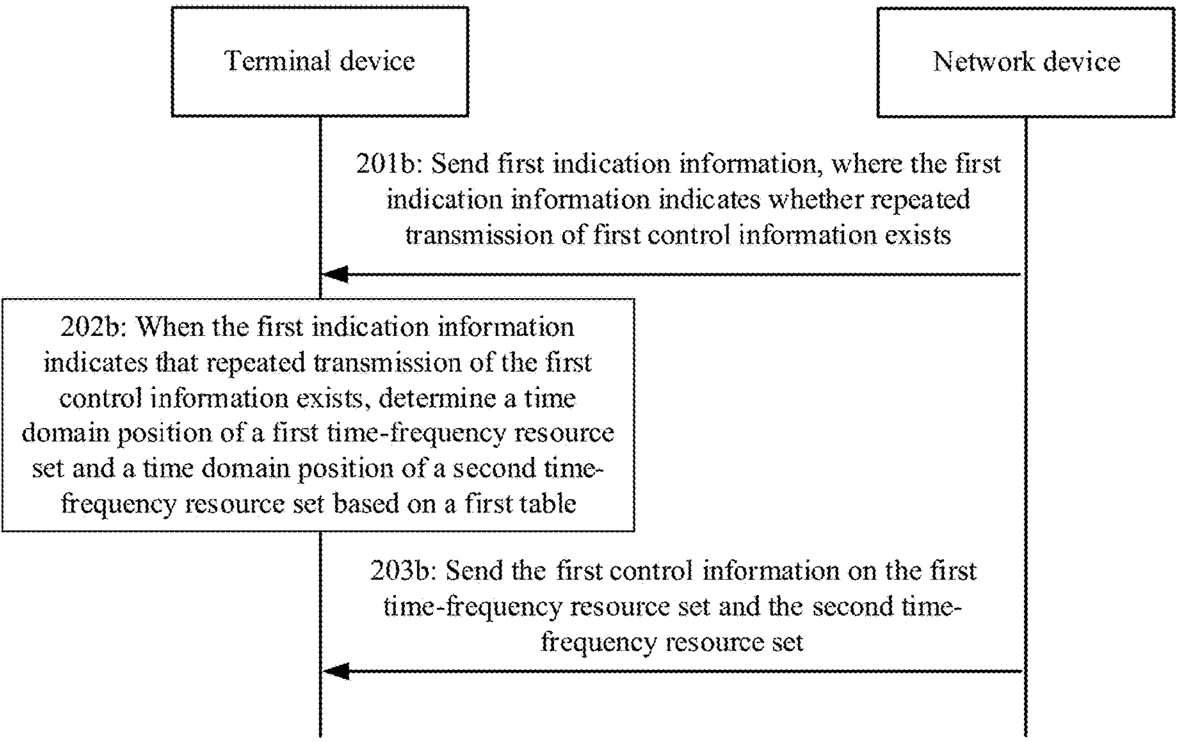
FIG. 2B is another flowchart of a control information sending (or receiving) method according to this application.

With reference to FIG. 2B, the following describes another main procedure of a control information sending (or receiving) method provided in this application. In this method, before a terminal device enters a connected state, the terminal device and a network device may perform the following steps:

Step 201*b*: The network device sends first indication information to the terminal device; and correspondingly, the terminal device receives the first indication information from the network device.

The first indication information indicates whether repeated transmission of first control information exists. Optionally, the first control information is control information for scheduling a system information block SIB 1; or the first control information is control information scrambled by a system information radio network temporary identifier SI-RNTI.

The first indication information indicates whether repeated transmission of the first control information exists. It may also be understood that the first indication information indicates whether the first control information needs to be repeatedly transmitted. It may also be understood that the first indication information indicates whether a time domain resource set (for example, the first time-frequency resource set) for repeatedly transmitting the first control information exists. It may also be understood that the first indication information indicates whether a time domain resource (for example, a first time-frequency resource in the first time-frequency resource set) for repeatedly transmitting the first control information exists. This is not specifically limited herein.

That the first time-frequency resource set is used to transmit first control information may be understood as that the first time-frequency resource set includes a plurality of time-frequency resources, and a first time-frequency resource in the plurality of time-frequency resources carries a control channel (for example, a downlink control channel PDCCH) for transmitting the first control information. The first time-frequency resource may be one time-frequency resource, for example, one resource block RB or one resource element RE. Alternatively, the first time-frequency resource may be a plurality of time-frequency resources, for example, a plurality of resource blocks RBs or a plurality of resource elements REs. This is not specifically limited herein.

In addition, the network device further configures a second time-frequency resource set for the terminal device according to a conventional technology, and the second time-frequency resource set is also a time-frequency resource for transmitting the first control information. It may also be understood that the second time-frequency resource set includes a plurality of time-frequency resources, and one of the plurality of time-frequency resources (referred to as a second time-frequency resource below) carries a control channel (for example, a downlink control channel PDCCH) for transmitting the first control information. Therefore, in this embodiment, the first time-frequency resource set may be understood as a time-frequency resource set that is additionally indicated by the network device to the terminal device and that is used to repeatedly transmit the first control information. The terminal device may receive the first control information on the first time-frequency resource in the first time-frequency resource set, or may receive the first control information on the second time-frequency resource in the second time-frequency resource set.

In this embodiment, the first indication information may use two different values to indicate whether repeated transmission of the first control information exists or not. For example, one value indicates that repeated transmission of the first control information does not exist, and the other value indicates that repeated transmission of the first control information exists. For example, two values of the first indication information are respectively 0 and 1. When the first indication information is 0, it indicates that repeated transmission of the first control information does not exist. In other words, the network device does not repeatedly send the control information to the terminal device on the first time-frequency resource in the first time-frequency resource set. In this case, the terminal device may monitor the first control information only on the second time-frequency resource set, instead of monitoring the first control information on the first time-frequency resource set. When the first indication information is 1, it indicates that repeated transmission of the first control information exists. In other words, the network device repeatedly sends the first control information to the terminal device on the first time-frequency resource in the first time-frequency resource set. In this case, the terminal device may monitor the first control information on both the first time-frequency resource set and the second time-frequency resource set. It should be understood that the foregoing example is merely intended to facilitate understanding of this solution. Alternatively, when the first indication information is 1, it indicates that the first time-frequency resource set does not exist; or when the first indication information is 0, it indicates that the first time-frequency resource set exists. In addition, another number may be used to distinguish between the two states: existent and not existent. This is not specifically limited herein.

Step 202*b*: When the first indication information indicates that repeated transmission of the first control information exists, the terminal device determines a time domain position of the first time-frequency resource set and a time domain position of the second time-frequency resource set based on a first table.

The first table is a newly defined reference table, and values of some parameters are added to the newly defined reference table based on a reference table in the conventional technology (namely, Table 13-11 in the protocol 38.213 or Table 13-12 in the protocol 38.213), so that the first table not only includes parameters for determining the time-frequency domain position of the second time-frequency resource set, but also includes parameters for determining the time-frequency position of the first time-frequency resource set.

Optionally, the first table includes an index value of a first symbol in a monitoring window of the first time-frequency resource set and an index value of a first symbol in a monitoring window of the second time-frequency resource set. The index value of the first symbol in the monitoring window of the second time-frequency resource set may be understood as a parameter for determining the time-frequency domain position of the second time-frequency resource set. The index value of the first symbol in the monitoring window of the first time-frequency resource set may be understood as a parameter for determining the time-frequency domain position of the first time-frequency resource set.

Optionally, the first table further includes a first index value determined based on second indication information, the first index value corresponds to the index value of the first symbol in the monitoring window of the first time-frequency resource set, and the first index value corresponds to the index value of the first symbol in the monitoring window of the second time-frequency resource set. In this case, the terminal device may obtain two index values (namely, the index value of the first symbol in the monitoring window of the first time-frequency resource set and the index value of the first symbol in the monitoring window of the second time-frequency resource set) about the first symbol in one table lookup operation by querying the first table based on the first index value. However, in the conventional technology, only one index value of the first symbol (namely, the index value of the first symbol in the monitoring window of the second time-frequency resource set) can be found based on the first index value determined based on the second indication information. Therefore, the solution provided in this embodiment helps reduce a quantity of times that the terminal device queries a reference table, and helps the terminal device quickly determine the time domain position of the first time-frequency resource set and the time domain position of the second time-frequency resource set.

For example, the first table includes:

| First index value determined based on the second indication information | O | Quantity of slots in each search space set | M | Index value of the first symbol in the monitoring window |
|---|---|---|---|---|
| 0 | 0 | 1 | 1 | 0 &$N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of a first SSB, and M indicates a degree of overlap between the monitoring window of the first SSB and a monitoring window of an adjacent SSB. For descriptions of the first table, refer to the following embodiment corresponding to FIG. 5. Details are not described herein again.

In a possible implementation, the terminal device determines the time domain position of the first time-frequency resource set and the time domain position of the second time-frequency resource set based on the second indication information, an index value of the first synchronization signal block SSB, and the first table.

Specifically, the terminal device can determine an index value based on the second indication information. By querying the first table with the index value, the terminal device may obtain a parameter for calculating the time domain position of the first time-frequency resource set and a parameter for calculating the time domain position of the second time-frequency resource set. Then, the terminal device determines the time domain position of the first time-frequency resource set based on the index value of the first SSB and the parameter for calculating the time domain position of the first time-frequency resource set, and determines the time domain position of the second time-frequency resource set based on the index value of the first SSB and the parameter for calculating the time domain position of the second time-frequency resource set. For details, refer to related descriptions in an embodiment corresponding to FIG. 5 below.

Step 203*b*: The network device sends the first control information to the terminal device on each of the first time-frequency resource set and the second time-frequency resource set; and correspondingly, the terminal device receives the first control information on each of the first time-frequency resource set and the second time-frequency resource set.

In this embodiment, step 203*b* is similar to step 203*a*. For details, refer to related descriptions in step 203*a*. Details are not described herein again.

In this implementation, before being in the connected state, the terminal device may receive the first indication information for indicating whether to repeatedly transmit the first control information. When the first indication information indicates that the first control information needs to be repeatedly transmitted, the terminal device queries a newly defined table (namely, the first table), and the terminal device can determine, based on the first table, two time-frequency resource sets (namely, the first time-frequency resource set and the second time-frequency resource set) for transmitting the first control information. Then, the terminal device receives the first control information on the first time-frequency resource set and the second time-frequency resource set. In other words, the network device not only sends the first control information to the terminal device on the first time-frequency resource set, but also sends the first control information to the terminal device on the second time-frequency resource set. Therefore, the terminal device may receive the first control information on the first time-frequency resource set, or may receive the first control information on the second time-frequency resource set. In comparison with a conventional technology in which the terminal device in a non-connected state receives the first control information only on the second time-frequency resource set, the terminal device in the solution of this application may receive the first control information by using at least two time-frequency resource sets, and the terminal device can receive at least two pieces of first control information. Therefore, a probability of correctly receiving the first control information by the terminal device can be increased.

Figure 3:
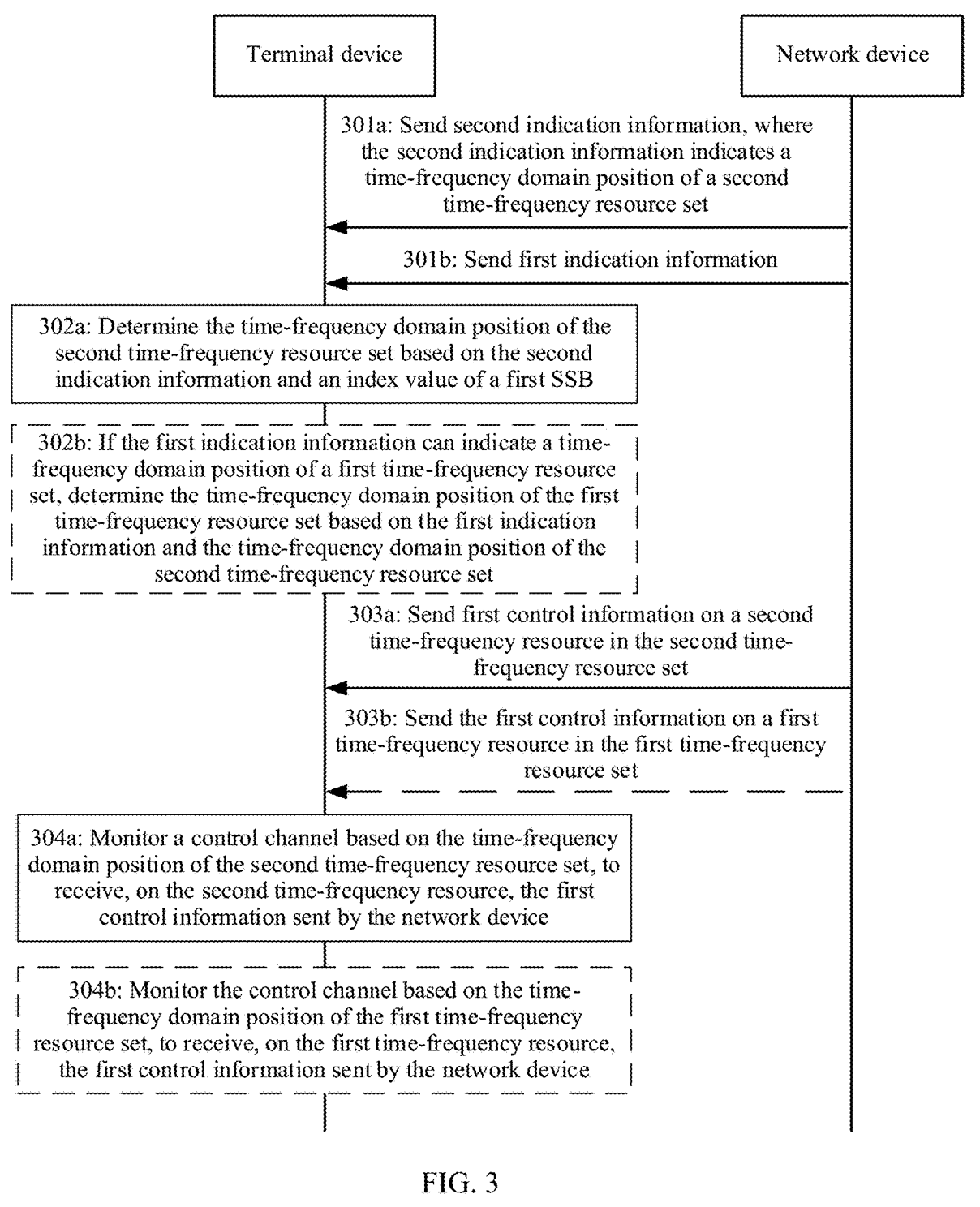

With reference to FIG. 3, the following further describes a control information sending (or receiving) method provided in this application. In this method, first indication information can not only reflect whether a first time-frequency resource exists, but can also directly or indirectly indicate a time-frequency domain position of a first time-frequency resource set to which the first time-frequency resource belongs. Specifically, a terminal device and a network device mainly perform the following steps:

Step 301*a*: The network device sends second indication information to the terminal device; and correspondingly, the terminal device receives the second indication information from the network device.

The second indication information indicates a time-frequency domain position of a second time-frequency resource set. The second time-frequency resource set includes a plurality of time-frequency resources. The plurality of time-frequency resources include a second time-frequency resource. The second time-frequency resource is a time-frequency resource that is configured by the network device for the terminal device according to a conventional technology and that is used to transmit control information (for example, the first control information). It may also be understood that the second time-frequency resource is used by the network device to send control information (for example, the first control information) to the terminal device. It may also be understood that the second time-frequency resource is a time-frequency resource for carrying a control channel, and the network device may send control information (for example, the first control information) to the terminal device on the control channel.

In addition, the second indication information may be included in a physical broadcast channel (PBCH). That is, the network device sends the second indication information to the terminal device by using the physical broadcast channel PBCH. Optionally, the physical broadcast channel PBCH may be a periodic broadcast PBCH. For example, the terminal device may periodically blindly detect a synchronization signal/broadcast channel block (SS/PBCH block, SSB), to obtain a PBCH in the SSB, and then obtain the second indication information from the PBCH.

For example, the second time-frequency resource may be a time-frequency resource carrying a physical downlink control channel PDCCH. The control information may be downlink control information DCI, sidelink control information, or the like. The second indication information may be pdcch-ConfigSIB1 in a master information block MIB. This is not specifically limited herein.

For example, the second time-frequency resource set may be a time-frequency resource set occupied by a type 0 physical downlink control channel PDCCH (Type0-PDCCH). That is, the time-frequency domain position of the second time-frequency resource set is a time-frequency domain position of the time-frequency resource set occupied by the type 0 PDCCH. Alternatively, the second time-frequency resource set may be a time-frequency resource set occupied by a type 1 physical downlink control channel PDCCH (Type0-PDCCH). That is, the time-frequency domain position of the second time-frequency resource set is a time-frequency domain position of the time-frequency resource set occupied by the type 1 PDCCH. This is not specifically limited herein. The time-frequency resource set may be specifically represented as a control resource set CORESET, or may be represented as a set of time-frequency resources carrying a control channel candidate set (namely, PDCCH candidates), or may be represented as another type of time-frequency resource unit. This is not specifically limited herein.

Step 301*b*: The network device sends first indication information to the terminal device; and correspondingly, the terminal device receives the first indication information from the network device.

The first indication information can reflect whether the first time-frequency resource exists. If the first time-frequency resource exists, it may be represented as that the first indication information indicates the time-frequency domain position of the first time-frequency resource set to which the first time-frequency resource belongs. If the first time-frequency resource does not exist, it may be represented as that the first indication information indicates that the first time-frequency resource set does not exist, or the first indication information does not indicate the time-frequency domain position of the first time-frequency resource set (or does not indicate a time-frequency domain position of another time-frequency resource set). The first time-frequency resource is also a time-frequency resource for transmitting control information, and the first time-frequency resource and the second time-frequency resource are used to transmit same control information. An example in which both the first time-frequency resource and the second time-frequency resource may be used to transmit the first control information is used below for description. In comparison with the second time-frequency resource, the first time-frequency resource may be understood as a time-frequency resource that is additionally configured by the network device for the terminal device and that is used to repeatedly transmit the first control information. The first indication information may be understood as being used to indicate whether the network device configures, for the terminal device, a time-frequency resource for repeatedly transmitting the first control information.

Usually, when the network device configures, for the terminal device, the time-frequency resource for transmitting the control information, it may also be understood that when the network device configures, for the terminal device, the time-frequency resource for carrying the control channel, the network device indicates a time-frequency resource set to the terminal device. The time-frequency resource set includes the time-frequency resource for transmitting the control information (or the time-frequency resource for carrying the control channel). Then, the terminal device monitors the control channel on each time-frequency resource in the time-frequency resource set, so that control information (for example, the first control information) is received on a control channel in a plurality of monitored control channels. Therefore, the first indication information may also be understood as reflecting whether the first time-frequency resource set exists. Certainly, when the first indication information indicates the time-frequency domain position of the first time-frequency resource set, it also implicitly indicates that the first time-frequency resource exists in the first time-frequency resource set. When the first indication information indicates that the first time-frequency resource set does not exist, it also implicitly indicates that the first time-frequency resource does not exist.

In actual application, the first indication information may use two different values to indicate whether the first time-frequency resource set exists or not. For example, one value indicates that the first time-frequency resource set does not exist, and the other value indicates that the first time-frequency resource set exists. For example, two values of the first indication information are respectively 0 and 1. When the first indication information is 0, it indicates that the first time-frequency resource set does not exist. In other words, the network device does not repeatedly send the control information to the terminal device on the first time-frequency resource in the first time-frequency resource set. In this case, the terminal device may monitor the first control information only on the second time-frequency resource set, instead of monitoring the first control information on the first time-frequency resource set. When the first indication information is 1, it indicates that the first time-frequency resource set exists. In other words, the network device repeatedly sends the first control information to the terminal device on the first time-frequency resource in the first time-frequency resource set. In this case, the terminal device may monitor the first control information on both the first time-frequency resource set and the second time-frequency resource set. It should be understood that the foregoing example is merely intended to facilitate understanding of this solution. Alternatively, when the first indication information is 1, it indicates that the first time-frequency resource set does not exist; or when the first indication information is 0, it indicates that the first time-frequency resource set exists. In addition, another number may be used to distinguish between the two states: existent and not existent. This is not specifically limited herein.

It should be understood that, before the network device sends the first indication information to the terminal device, the network device determines, based on one or more related factors, whether the first indication information sent to the terminal device indicates that the first time-frequency resource set exists, or indicates that the first time-frequency resource set does not exist, which may be also understood as whether the network device configures the first time-frequency resource set for the terminal device. The foregoing related factors include but are not limited to a distance between the network device and the terminal device, quality of communication between the network device and the terminal device, or the like.

In an optional implementation, the network device may learn of a position of the terminal device in a process in which the terminal device accesses a network and in a subsequent process of exchanging information with the terminal device. Then, when the distance between the terminal device and the network device is greater than or equal to a first preset threshold, the first indication information sent by the network device to the terminal device may indicate that the first time-frequency resource set exists. When the distance between the terminal device and the network device is less than the first preset threshold, the first indication information sent by the network device to the terminal device may indicate that the first time-frequency resource set does not exist.

In another optional implementation, in a process of exchanging information with the terminal device, the network device may learn of the quality of communication between the network device and the terminal device. Then, when the quality of communication between the network device and the terminal device is lower than or equal to the second preset threshold, the first indication information sent by the network device to the terminal device indicates that the first time-frequency resource set exists. When the quality of communication between the network device and the terminal device is higher than the second preset threshold, the first indication information sent by the network device to the terminal device may indicate that the first time-frequency resource set does not exist.

It should be understood that the foregoing example is merely used to prove feasibility of this solution. With reference to other factors, the network device may further determine indication content of the first indication information sent to the terminal. Details are not described herein again.

It should be further understood that when the first indication information indicates that the first time-frequency resource set exists, that is, the first time-frequency resource used by the network device to repeatedly send the control information to the terminal device exists, the terminal device performs steps 302*b* and 304*b*, and the network device also performs step 303*b*. When the first indication information indicates that the first time-frequency resource set does not exist, that is, the first time-frequency resource used by the network device to repeatedly send the control information to the terminal device does not exist, the terminal device does not perform steps 302*b* and 304*b*, and the network device does not perform step 303*b*.

In addition, the first indication information can not only reflect whether the first time-frequency resource set exists, but also indicate the time-frequency domain position of the first time-frequency resource set.

Specifically, the first indication information can indicate the time-frequency domain position of the first time-frequency resource set relative to the time-frequency domain position of the second time-frequency resource set, that is, an association relationship (referred to as a first association relationship below) between the time-frequency domain position of the first time-frequency resource set and the time-frequency domain position of the second time-frequency resource set. It may also be understood that the first indication information indirectly indicates the time-frequency domain position of the first time-frequency resource set by indicating the first association relationship.

Specifically, the first association relationship has a plurality of different implementations:

In a possible implementation, the first association relationship indicates that the first time-frequency resource set and the second time-frequency resource set are located in a same slot in time domain. Optionally, the first time-frequency resource set and the second time-frequency resource set are respectively located on consecutive and different symbols in the same slot in the time domain. The consecutive and different symbols represent two adjacent symbols, or two symbols with consecutive index values. For example, the first time-frequency resource set and the second time-frequency resource set are respectively located in a symbol whose index value is 0 in a slot and a symbol whose index value is 1 in the slot. For another example, the first time-frequency resource set and the second time-frequency resource set are respectively located in a symbol whose index value is 7 in a slot and a symbol whose index value is 8 in the slot. Certainly, in a same slot, a symbol in which the first time-frequency resource set is located may be before or after a symbol in which the second time-frequency resource set is located. For example, the first time-frequency resource set may be located in the symbol whose index value is 1 in the slot, and the second time-frequency resource set is located in the symbol whose index value is 0 in the slot; or the first time-frequency resource set may be located in the symbol whose index value is 0 in the slot, and the second time-frequency resource set is located in the symbol whose index value is 1 in the slot. This is not specifically limited herein.

Figure 4A:
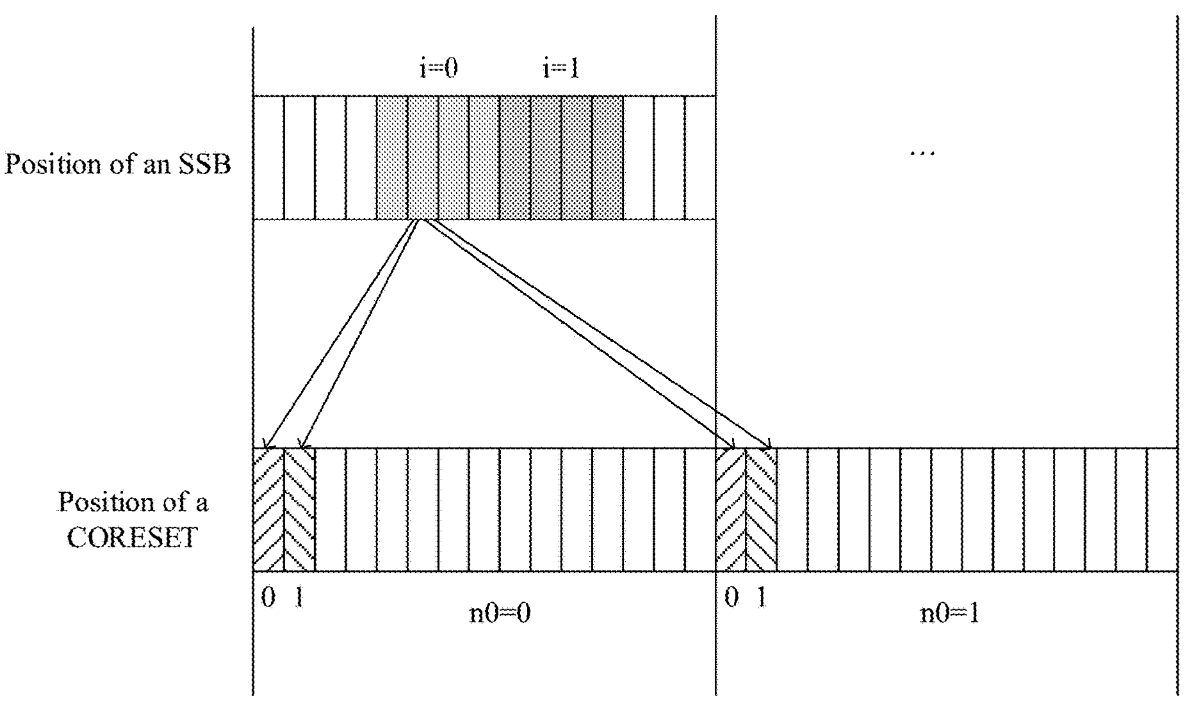
FIG. 4A is a schematic diagram of a time domain position of a first time-frequency resource set and a time domain position of a second time-frequency resource set in this application.

For ease of understanding, FIG. 4A is used as an example. FIG. 4A is a schematic diagram of distribution of a first time-frequency resource set and a second time-frequency resource set in time domain. Distribution statuses of time-frequency resources in two slots corresponding to index values of a same SSB are listed. An index value 0 (that is, i=0) of an SSB corresponds to a slot whose index value is 0 (a slot 0 for short) and a slot whose index value is 1 (a slot 1 for short). The slot 0 includes both the time-frequency resource that belongs to the first time-frequency resource set and the time-frequency resource that belongs to the second time-frequency resource set. Similarly, the slot 1 includes both the time-frequency resource that belongs to the first time-frequency resource set and the time-frequency resource that belongs to the second time-frequency resource set. In the slot 0, the time-frequency resource that belongs to the second time-frequency resource set is in a first symbol (namely, the symbol whose index value is 0) in the slot 0, and the time-frequency resource that belongs to the first time-frequency resource set is in a second symbol (namely, the symbol whose index value is 1) in the slot 0. In the slot 1, the time-frequency resource that belongs to the second time-frequency resource set is in the first symbol (namely, the symbol whose index value is 0) in the slot 1, and the time-frequency resource that belongs to the first time-frequency resource set is in the second symbol (namely, the symbol whose index value is 1) in the slot 1.

In this implementation, it is proposed that the first time-frequency resource set and the second time-frequency resource set are respectively located in the same slot in the time domain. In a process in which the terminal device monitors the control channel in the slot indicated by the time domain position of the second time-frequency resource set, the terminal device may receive at least two pieces of first control information in several consecutive symbols in the slot, and the terminal device does not need to additionally monitor a control channel in another slot (for example, a slot other than the time domain position of the second time-frequency resource set). This helps reduce a time required by the terminal device to obtain the first control information, and helps improve a success rate of receiving the first control information by the terminal device.

In another possible implementation, the first association relationship indicates that the first time-frequency resource set and the second time-frequency resource set are respectively located in different slots in time domain. Optionally, a slot in which the first time-frequency resource set is located is adjacent to a slot in which the second time-frequency resource set is located. That is, an index value of the slot in which the first time-frequency resource set is located is consecutive to an index value of the slot in which the second time-frequency resource set is located. For example, the first time-frequency resource set and the second time-frequency resource set are respectively located in a slot whose index value is 0 and a slot whose index value is 1. The first time-frequency resource set is located in the slot whose index value is 0, and the second time-frequency resource set is located in the slot whose index value is 1; or the first time-frequency resource set is located in the slot whose index value is 1, and the second time-frequency resource set is located in the slot whose index value is 0.

Optionally, the slot in which the first time-frequency resource set is located is before the slot in which the second time-frequency resource set is located. For example, the first time-frequency resource set is located in the slot whose index value is 0, and the second time-frequency resource set is located in the slot whose index value is 1. In this case, a time at which the network device may send the first control information to the terminal device on the first time-frequency resource set is earlier than a time at which the network device sends the first control information to the terminal device on the second time-frequency resource set. Therefore, in comparison with a solution in which the first control information is received only from the second time-frequency resource set, the terminal device may receive the first control information earlier. This helps shorten a time required by the terminal device to receive the first control information.

Optionally, an index value of a symbol in a slot in which the first time-frequency resource set is located is the same as an index value of a symbol in a slot in which the second time-frequency resource set is located. For example, the first time-frequency resource set is located in a first symbol (namely, the symbol whose index value is 0) in the slot whose index value is 0, and the first time-frequency resource set is located in a first symbol (namely, the symbol whose index value is 0) in the slot whose index value is 1.

Figure 4B:
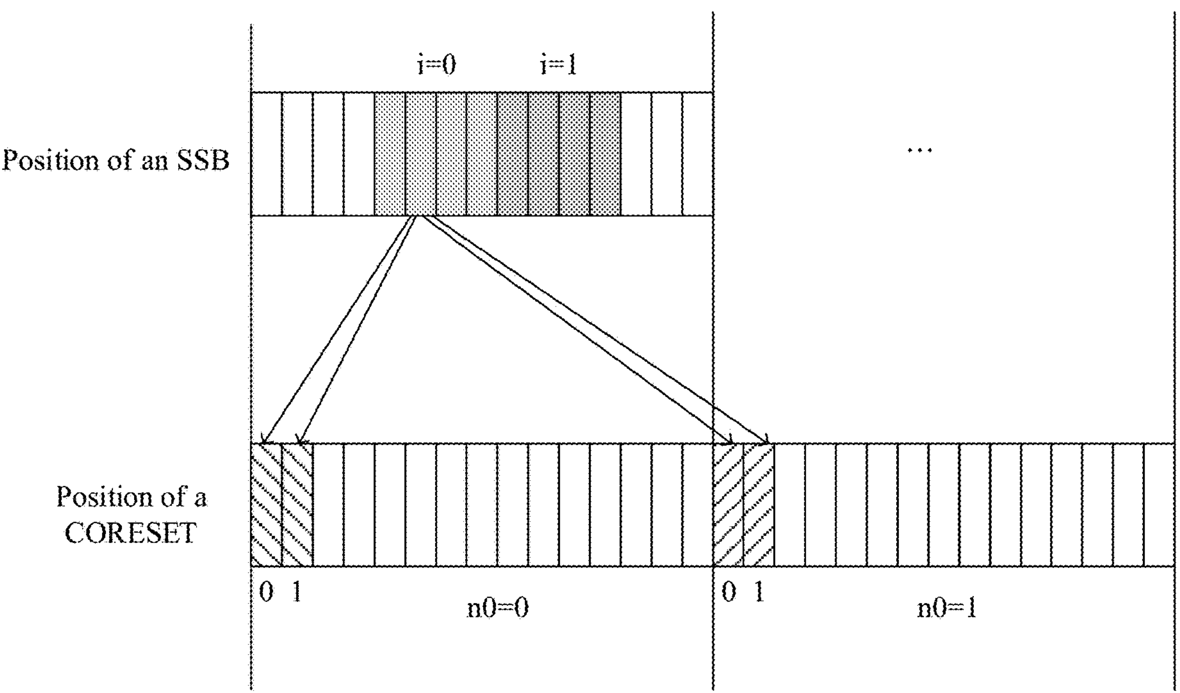
FIG. 4B is another schematic diagram of a time domain position of a first time-frequency resource set and a time domain position of a second time-frequency resource set in this application.
Figure 4B:
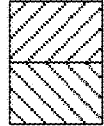

For ease of understanding, FIG. 4B is used as an example. FIG. 4B is a schematic diagram of distribution of a first time-frequency resource set and a second time-frequency resource set in time domain. Distribution statuses of time-frequency resources in two slots corresponding to index values of a same SSB are listed. An index value 0 (that is, i=0) of an SSB corresponds to a slot whose index value is 0 (a slot 0 for short) and a slot whose index value is 1 (a slot 1 for short). A time-frequency resource that belongs to the first time-frequency resource set is located in the slot 0, and occupies first two symbols (namely, a symbol 0 and a symbol 1) in the slot 0. A time-frequency resource that belongs to the second time-frequency resource set is located in the slot 1, and occupies first two symbols (namely, a symbol 0 and a symbol 1) in the slot 1.

In this implementation, it is proposed that the first time-frequency resource set and the second time-frequency resource set are respectively located in the consecutive and different slots in the time domain. The terminal device may receive at least two pieces of first control information in the consecutive and different slots, and the terminal device does not need to monitor a control channel in inconsecutive slots (for example, a slot whose index value is 0 and a slot whose index value is 3). This helps the terminal device obtain the first control information in a relatively short time, and helps improve a success rate of receiving the first control information by the terminal device.

In actual application, the first indication information may be implemented in any one or more of the foregoing implementations, and the first indication information may indicate a plurality of different meanings by using different values. Specifically, one value indicates that the first time-frequency resource set does not exist, another value indicates that the first time-frequency resource set and the second time-frequency resource set are respectively located on consecutive and different symbols in a same slot in time domain, and the other value indicates that the first time-frequency resource set and the second time-frequency resource set are respectively located in different slots in time domain. For example, values and meanings of the first indication information may be shown in Table 1-1 below:

TABLE 1-1

| Value of the first indication information | Meaning of the first indication information |
|---|---|
| 0 | The first time-frequency resource set does not exist |
| 1 | The first time-frequency resource set and the second time-frequency resource set are respectively located on consecutive and different symbols in a same slot |
| 2 | The first time-frequency resource set and the second time-frequency resource set are respectively located in consecutive and different slots |
| 3 | Reserved |

As shown in Table 1-1, values of the first indication information are respectively 0, 1, and 2. When the value of the first indication information is 0, it indicates that the first time-frequency resource set does not exist. When the value of the first indication information is 1, it indicates that the first time-frequency resource set and the second time-frequency resource set are respectively located on consecutive and different symbols in a same slot in time domain. When the first indication information is 2, it indicates that the first time-frequency resource set and the second time-frequency resource set are respectively located in different slots in time domain.

In this implementation, the first indication information sent by the network device can not only indicate whether the first time-frequency resource set exists, but can also indicate a position of the first time-frequency resource set. Therefore, the terminal device may preliminarily determine the time-frequency domain position of the first time-frequency resource set based on the first indication information, thereby narrowing a range in which the terminal device monitors the control information, and helping reduce load of the terminal device.

Optionally, the first indication information may be further used to indicate a quantity of symbols occupied by the first time-frequency resource set in time domain in a time period. In this case, the first indication information may also indicate a plurality of different meanings by using different values. Specifically, one value indicates that the first time-frequency resource set does not exist; another value indicates that the first time-frequency resource set exists, and the first time-frequency resource set occupies one symbol in time domain in a time period; another value indicates that the first time-frequency resource set exists, and the first time-frequency resource set occupies two symbols in time domain in a time period; and the other value indicates that the first time-frequency resource set exists, and the first time-frequency resource set occupies three symbols in time domain in a time period. A length of the time period (which is a quantity of symbols that are occupied by the first time-frequency resource set in time domain and that are indicated by the first indication information) includes but is not limited to one sending period or one slot of the control information, a plurality of inconsecutive slots, a plurality of consecutive slots, one subframe, or a plurality of consecutive subframes in one sending period of the control information, a plurality of inconsecutive subframes in one sending period of the control information, or the like. This is not specifically limited herein. It should be understood that, in this embodiment of this application, the quantity of symbols that are occupied by the first time-frequency resource set in time domain and that are indicated by the first indication information is the quantity of symbols occupied by the first time-frequency resource set in time domain in a time period. For brevity of description, the quantity of symbols occupied by the first time-frequency resource set in time domain is not specifically described in the following.

For example, values and meanings of the first indication information may be shown in Table 2-1 below:

TABLE 2-1

| Value of the first indication information | Meaning of the first indication information |
|---|---|
| 0 | The first time-frequency resource set does not exist |
| 1 | The first time-frequency resource set exists and occupies one symbol |
| 2 | The first time-frequency resource set exists and occupies two symbols |
| 3 | The first time-frequency resource set exists and occupies three symbols |

As shown in Table 2-1, values of the first indication information are respectively 0, 1, 2, and 3. When the value of the first indication information is 0, it indicates that the first time-frequency resource set does not exist. When the value of the first indication information is 1, it indicates that the first time-frequency resource set exists and the first time-frequency resource set occupies one symbol in time domain. When the value of the first indication information is 2, it indicates that the first time-frequency resource set exists and the first time-frequency resource set occupies two symbols in time domain. When the value of the first indication information is 3, it indicates that the first time-frequency resource set exists and the first time-frequency resource set occupies three symbols in time domain.

In this implementation, the first indication information sent by the network device can not only indicate whether the first time-frequency resource set exists, but can also indicate a quantity of symbols in the first time-frequency resource set. Therefore, the terminal device may determine the quantity of symbols in the first time-frequency resource set based on the first indication information. In a process of monitoring the control information, if the control information has been repeatedly monitored in L symbols, when the L symbols are equal to the quantity of symbols indicated by the first indication information, the terminal device does not need to monitor the control information on another time-frequency resource, thereby reducing load of the terminal device.

In an optional implementation, when the first time-frequency resource set and the second time-frequency resource set occupy no more than three symbols in time domain, and the second time-frequency resource set occupies one symbol in time domain, the first indication information may indicate three different meanings by using three different values. Specifically, one value indicates that the first time-frequency resource set does not exist, another value indicates that the first time-frequency resource set exists and the first time-frequency resource set occupies one symbol in time domain, and the other value indicates that the first time-frequency resource set exists and the first time-frequency resource set occupies two symbols in time domain. For example, values and meanings of the first indication information may be shown in Table 2-2 below:

TABLE 2-2

| Value of the first indication information | Meaning of the first indication information |
|---|---|
| 0 | The first time-frequency resource set does not exist |
| 1 | The first time-frequency resource set exists and occupies one symbol |
| 2 | The first time-frequency resource set exists and occupies two symbols |
| 3 | Reserved |

As shown in Table 2-2, values of the first indication information are respectively 0, 1, and 2. When the value of the first indication information is 0, it indicates that the first time-frequency resource set does not exist. When the value of the first indication information is 1, it indicates that the first time-frequency resource set exists and the first time-frequency resource set occupies one symbol in time domain. When the value of the first indication information is 2, it indicates that the first time-frequency resource set exists and the first time-frequency resource set occupies two symbols in time domain.

In an optional implementation, when the first time-frequency resource set and the second time-frequency resource set occupy no more than three symbols in time domain, and the second time-frequency resource set occupies two symbols in time domain, the first indication information may indicate three different meanings by using three different values. Specifically, one value indicates that the first time-frequency resource set does not exist, and the other value indicates that the first time-frequency resource set exists and the first time-frequency resource set occupies one symbol in time domain. For example, values and meanings of the first indication information may be shown in Table 2-3 below:

TABLE 2-3

| Value of the first indication information | Meaning of the first indication information |
|---|---|
| 0 | The first time-frequency resource set does not exist |
| 1 | The first time-frequency resource set exists and occupies one symbol |
| 2 | Reserved |
| 3 | Reserved |

As shown in Table 2-3, values of the first indication information are respectively 0, and 1. When the value of the first indication information is 0, it indicates that the first time-frequency resource set does not exist. When the value of the first indication information is 1, it indicates that the first time-frequency resource set exists and the first time-frequency resource set occupies one symbol in time domain.

In an optional implementation, the first indication information may be used to indicate whether the first time-frequency resource set exists, a position of the first time-frequency resource set in time domain, and a quantity of symbols occupied by the first time-frequency resource set in time domain. Specifically, the first indication information may express four different meanings by using four different values. Specifically, one value indicates that the first time-frequency resource set does not exist; another value indicates that the first time-frequency resource set and the first time-frequency resource set are located in different slots in time domain; another value indicates that the first time-frequency resource set and the second time-frequency resource set are located in consecutive and different symbols in a same slot in time domain, and the first time-frequency resource set occupies one symbol; and the other value indicates that the first time-frequency resource set and the second time-frequency resource set are located on consecutive and different symbols in a same slot in time domain, and the first time-frequency resource set occupies two symbols. For example, values and meanings of the first indication information may be shown in Table 3-1 below:

TABLE 3-1

| Value of the first indication information | Meaning of the first indication information |
|---|---|
| 0 | The first time-frequency resource set does not exist |
| 1 | The first time-frequency resource set and the second time-frequency resource set are respectively located in different slots |
| 2 | The first time-frequency resource set and the second time-frequency resource set are respectively located on consecutive and different symbols in a same slot, and the first time-frequency resource set occupies two symbols |
| 3 | The first time-frequency resource set and the second time-frequency resource set are respectively located on consecutive and different symbols in a same slot, and the first time-frequency resource set occupies one symbol |

As shown in Table 3-1, values of the first indication information are 0, 1, 2, and 3. When the value of the first indication information is 0, it indicates that the first time-frequency resource set does not exist. When the value of the first indication information is 1, it indicates that the first time-frequency resource set and the second time-frequency resource set are located in different slots in time domain. When the value of the first indication information is 2, it indicates that the first time-frequency resource set and the second time-frequency resource set are located on consecutive and different symbols in a same slot in time domain, and the first time-frequency resource set occupies two symbols. When the value of the first indication information is 3, it indicates that the first time-frequency resource set and the second time-frequency resource set are located on consecutive and different symbols in a same slot in time domain, and the first time-frequency resource set occupies one symbol. In this implementation, the first indication information sent by the network device not only indicates the position of the first time-frequency resource set, but also indicates the quantity of symbols occupied by the first time-frequency resource set. Therefore, the terminal device can accurately locate the first time-frequency resource set with reference to the first indication information, thereby narrowing a range in which the terminal device monitors the control information, and helping reduce load of the terminal device.

In another optional implementation, the first indication information may express five different meanings by using five different values. Specifically, one value indicates that the first time-frequency resource set does not exist; another value indicates that the first time-frequency resource set and the second time-frequency resource set are located in different slots in time domain, and the first time-frequency resource set occupies one symbol; another value indicates that the first time-frequency resource set and the second time-frequency resource set are located in different slots in time domain, and the first time-frequency resource set occupies two symbols; another value indicates that the first time-frequency resource set and the second time-frequency resource set are located in consecutive and different symbols in a same slot in time domain, and the first time-frequency resource set occupies one symbol; and the other value indicates that the first time-frequency resource set and the second time-frequency resource set are located on consecutive and different symbols in a same slot in time domain, and the first time-frequency resource set occupies two symbols.

TABLE 3-2

| Value of the first indication information | Meaning of the first indication information |
| --- | --- |
| 0 | The first time-frequency resource set does not exist |
| 1 | The first time-frequency resource set and the second time-frequency resource set are respectively located in different slots, and the first time-frequency resource set occupies two symbols |
| 2 | The first time-frequency resource set and the second time-frequency resource set are respectively located in different slots, and the first time-frequency resource set occupies one symbol |
| 3 | The first time-frequency resource set and the second time-frequency resource set are respectively located on consecutive and different symbols in a same slot, and the first time-frequency resource set occupies two symbols |
| 4 | The first time-frequency resource set and the second time-frequency resource set are respectively located on consecutive and different symbols in a same slot, and the first time-frequency resource set occupies one symbol |

As shown in Table 3-1, values of the first indication information are 0, 1, 2, and 3. When the value of the first indication information is 0, it indicates that the first time-frequency resource set does not exist. When the value of the first indication information is 1, it indicates that the first time-frequency resource set and the second time-frequency resource set are located in different slots in time domain, and the first time-frequency resource set occupies two symbols. When the value of the first indication information is 2, it indicates that the first time-frequency resource set and the second time-frequency resource set are located in different slots in time domain, and the first time-frequency resource set occupies one symbol. When the value of the first indication information is 3, it indicates that the first time-frequency resource set and the second time-frequency resource set are located on consecutive and different symbols in a same slot in time domain, and the first time-frequency resource set occupies two symbols. When the value of the first indication information is 4, it indicates that the first time-frequency resource set and the second time-frequency resource set are located on consecutive and different symbols in a same slot in time domain, and the first time-frequency resource set occupies one symbol.

It should be understood that the examples in Table 1-1, Table 2-1, Table 2-2, Table 2-3, Table 3-1, and Table 3-2 are merely intended to facilitate understanding of this solution. A correspondence between the value of the first indication information and the meaning of the first indication information may be flexibly set based on an actual situation. The value of the first indication information may alternatively be another number, or another value may be used to indicate more other meanings. Specifically, the value and the meaning of the first indication information should be flexibly determined with reference to an actual situation. This is not specifically limited herein.

In addition, the first indication information may be included in a physical broadcast channel (PBCH). That is, the network device sends the first indication information to the terminal device by using the physical broadcast channel PBCH. Optionally, the physical broadcast channel PBCH may be a periodic broadcast PBCH. For example, the terminal device may periodically blindly detect a synchronization signal/broadcast channel block (SS/PBCH block, SSB), to obtain a PBCH in the SSB, and then obtain the second indication information from the PBCH.

For example, the first time-frequency resource may be a time-frequency resource carrying a physical downlink control channel PDCCH. The first control information may be downlink control information DCI, sidelink control information, or the like. This is not specifically limited herein.

For example, the first time-frequency resource set may be a time-frequency resource set occupied by a type 0 physical downlink control channel PDCCH (Type0-PDCCH). That is, the time-frequency domain position of the first time-frequency resource set is a time-frequency domain position of the time-frequency resource set occupied by the type 0 PDCCH. Alternatively, the first time-frequency resource set may be a time-frequency resource set occupied by a type 1 physical downlink control channel PDCCH (Type0-PDCCH). That is, the time-frequency domain position of the first time-frequency resource set is a time-frequency domain position of the time-frequency resource set occupied by the type 1 PDCCH. This is not specifically limited herein. The time-frequency resource set may be specifically represented as a control resource set CORESET, or may be represented as a set of time-frequency resources carrying a control channel candidate set (namely, PDCCH candidates), or may be represented as another type of time-frequency resource unit. This is not specifically limited herein.

In this embodiment, a quantity of bits occupied by the first indication information is not greater than two. There are two reserved bits in the PBCH. Therefore, when the quantity of bits occupied by the first indication information is not greater than two, the first indication information may be placed in the two reserved bits in the PBCH, so that no new bit needs to be added to the PBCH, thereby avoiding adding new overheads to the PBCH.

It should be understood that there is no limitation on a time sequence between step 301_a_ and step 301_b_. The network device may first perform step 301_a_ and then perform step 301_b_, or the network device may first perform step 301_b_ and then perform step 301_a_, or the network device may simultaneously perform step 301_a_ and step 301_b_. This is not specifically limited herein. However, before the network device sends the first indication information and the second indication information to the terminal device, the network device first determines the time-frequency domain position of the second time-frequency resource, and then determines the time-frequency position of the first time-frequency resource.

Step 302_a_: The terminal device determines the time-frequency domain position of the second time-frequency resource set based on the second indication information and an index value of a first SSB.

Optionally, the terminal device may determine, based on the second indication information, an index value for querying a reference table, and then the terminal device queries a reference table in the conventional technology based on the index value, to obtain a parameter for determining the time-frequency domain position of the second time-frequency resource set. Then, the terminal device determines the time-frequency domain position of the second time-frequency resource set based on the index value of the first SSB and the parameter for determining the time-frequency domain position of the second time-frequency resource set.

Optionally, the second indication information may determine two index values, where one index value is used to determine a frequency domain range of the second time-frequency resource set, and the other index value is used to determine a time domain range of the second time-frequency resource set. For example, first several bits of the second indication information are used as an index value, and are used to query, in a reference table (for example, a reference table 13-1 (namely, Table 13-1 in the protocol 38.213) in the conventional technology), a parameter for determining the frequency domain range of the second time-frequency resource set. Last several bits of the second indication information are used as an index value, and are used to query, in a reference table (for example, a reference table 13-11 (namely, Table 13-11 in the protocol 38.213) (or a reference table 13-12 (namely, Table 13-12 in the protocol 38.213))) in the conventional technology, a parameter for determining the time domain range of the second time-frequency resource set.

For example, the second indication information may be a parameter that is in a master information block MIB and that is used to configure a time-frequency resource for carrying a control channel. For example, the second indication information is a parameter pdcch-ConfigSIB1, and pdcch-ConfigSIB1 includes eight bits, where four bits are ControlResourceSetZero, and the other four bits are SearchSpaceZero. ControlResourceSetZero is the four most significant bits of pdcch-ConfigSIB1, and is used to determine the frequency domain range of the second time-frequency resource set. The terminal device may determine the frequency domain position of the second time-frequency resource set based on a value of ControlResourceSetZero and the reference table 13-1 (namely, Table 13-1 in the protocol 38.213). The frequency domain position of the second time-frequency resource set may be represented by a quantity of consecutive RBs, a quantity of symbols, an RB offset, and the like. In addition, SearchSpaceZero is the four least significant bits of pdcch-ConfigSIB1, and is used to determine the time domain range of the second time-frequency resource set. Based on a value of SearchSpaceZero and the reference table 13-11 (namely, Table 13-11 in the protocol 38.213) (or the reference table 13-12 (namely, Table 13-12 in the protocol 38.213)), the terminal device may determine a quantity of second time-frequency resource sets in each slot, an index value of a first symbol of the second time-frequency resource set in the slot, and parameters O and M for determining an index value of the slot of the second time-frequency resource set. Then, the terminal device determines the time domain position of the second time-frequency resource based on the index value of the first symbol of the second time-frequency resource set in the slot and the index value of the slot of the second time-frequency resource set.

Specifically, the terminal device may determine the index value no of the slot of the second time-frequency resource set according to the following formula 1:

$$n_0 = (O \cdot 2^{\mu} + [i \cdot M]) \bmod N_{slot}^{frame,\mu} \quad \text{(Formula 1)}$$

O represents a starting position of a monitoring window of the first SSB, and is used to avoid a conflict between a monitoring window of a Type0-PDCCH CSS and a monitoring window of an SSB. M represents a degree of overlap between a monitoring window of an SSB i and a monitoring window of an SSB i+1. i represents the index value of the first SSB. μ represents a subcarrier spacing.

$$N_{slot}^{frame,\mu}$$

represents a quantity of slots in a radio frame. When the subcarrier spacing is determined, the quantity of slots in the radio frame is determined.

The terminal device can determine the frequency domain position of the second time-frequency resource set based on the four most significant bits in the second indication information, and can determine the time domain position of the second time-frequency resource set based on the four least significant bits in the second indication information and the index value of the first SSB. Therefore, the terminal device can determine the time-frequency domain position of the second time-frequency resource set based on the second indication information and the index value of the first SSB. It should be understood that determining, by the terminal device, the time domain position of the second time-frequency resource set may also be understood as that the terminal device can determine an occasion for monitoring the second time-frequency resource, namely, an occasion determined by an index value of a slot in the second time-frequency resource set and an index value of a first symbol in a slot corresponding to the index value of the slot.

Then, the terminal device monitors a control channel based on the time-frequency domain position of the second time-frequency resource set, so that the terminal device can receive the first control information on a control channel carried on the second time-frequency resource.

Step 302_b_: If the first indication information can indicate the time-frequency domain position of the first time-frequency resource set, the terminal device determines the time-frequency domain position of the first time-frequency resource set based on the first indication information and the time-frequency domain position of the second time-frequency resource set.

The first indication information can indicate an association relationship (namely, the first association relationship) between the time-frequency domain position of the first time-frequency resource set and the time-frequency domain position of the second time-frequency resource set. Therefore, the terminal device may determine the time-frequency domain position of the first time-frequency resource set based on the first association relationship and the time-frequency domain position of the second time-frequency resource set.

In a possible implementation, the first association relationship indicates that the first time-frequency resource set and the second time-frequency resource set are located on consecutive and different symbols in a same slot in time domain. In this case, the terminal device may determine that a symbol adjacent to the symbol in the slot in which the second time-frequency resource set is located is the time domain position of the first time-frequency resource set, and use the frequency domain position of the second time-frequency resource set as the frequency domain position of the first time-frequency resource set. In this way, the terminal device determines the time-frequency domain position of the first time-frequency resource set.

For ease of understanding, FIG. 4A in the foregoing is used as an example. If the terminal device determines that the second time-frequency resource set is located in the first symbol in the slot 0 (namely, the symbol whose index value is 0 in the slot 0) and the first symbol in the slot 1 (namely, the symbol whose index value is 1 in the slot 1), the terminal device may determine, based on the first association relationship, that the first time-frequency resource set is also located in the slot 0 and the slot 1. However, the first time-frequency resource set is located in the second symbol in the slot 0 (namely, the symbol whose index value is 1 in the slot 0) and the second symbol in the slot 1 (namely, the symbol whose index value is 1 in the slot 1).

In another possible implementation, the first association relationship indicates that the first time-frequency resource set and the second time-frequency resource set are respectively located in different slots in time domain. Usually, to reduce complexity, by default, the index value of the symbol in the slot in which the first time-frequency resource set is located is the same as the index value of the symbol in the slot in which the second time-frequency resource set is located. In this case, the terminal device may determine the index value of the slot in which the first time-frequency resource set is located by incrementing or decrementing the index value of the slot in which the second time-frequency resource set is located by 1. In addition, the terminal device uses the index value of the symbol in the slot in the second time-frequency resource set as the index value of the symbol in the slot in the first time-frequency resource set. In this way, the terminal device determines the time-frequency domain position of the first time-frequency resource set.

For ease of understanding, FIG. 4B in the foregoing is used as an example. If the terminal device determines that the second time-frequency resource set is located in the first symbol in the slot 1 (namely, the symbol whose index value is 0 in the slot 1) and the second symbol in the slot 1 (namely, the symbol whose index value is 1 in the slot 1), the terminal device may determine, based on the first association relationship, that the first time-frequency resource set is also located in the slot 0 or located in a slot 2. For example, the first time-frequency resource set is located in the slot 0. The first time-frequency resource set is located in the first symbol in the slot 0 (namely, the symbol whose index value is 0 in the slot 0) and the second symbol in the slot 0 (namely, the symbol whose index value is 1 in the slot 0).

Step 303*a*: The network device sends the first control information to the terminal device on the second time-frequency resource in the second time-frequency resource set.

Step 303*b*: The network device sends the first control information to the terminal device on the first time-frequency resource in the first time-frequency resource set.

In this embodiment, step 303*b* is an optional step. The network device performs step 303*b* only after the network device determines that the first indication information can reflect that the first time-frequency resource set exists, that is, after the network device configures the first time-frequency resource set for the terminal device.

In this step, when the first indication information indicates that the first time-frequency resource set exists, the network device may repeatedly send the first control information to the terminal device on the first time-frequency resource in the first time-frequency resource set. Optionally, the network device may repeatedly send the first control information to the terminal device in a periodic manner.

It should be understood that when the network device can perform step 303*b*, the network device repeatedly sends at least two pieces of first control information to the terminal device by using each of the first time-frequency resource and the second time-frequency resource (one piece of first control information is transmitted by using the first time-frequency resource, and the other piece of first control information is transmitted by using the second time-frequency resource).

Optionally, the first time-frequency resource and the second time-frequency resource occupy a same frequency domain resource, so that the network device may repeatedly send the control information in a same frequency domain. This helps the network device complete a repeated sending operation of the first control information, and also helps the network device manage the time-frequency resource.

Step 304*a*: The terminal device monitors the control channel based on the time-frequency domain position of the second time-frequency resource set, to receive, on the second time-frequency resource, the first control information sent by the network device.

Specifically, after the terminal device determines the time-frequency domain position of the second time-frequency resource set, because the second time-frequency resource set includes a plurality of time-frequency resources, the terminal device monitors a control channel at a position of each of the plurality of time-frequency resources, to receive, on the second time-frequency resource, the first control information sent by the network device.

Step 304*b*: The terminal device monitors the control channel based on the time-frequency domain position of the first time-frequency resource set, to receive, on the first time-frequency resource, the first control information sent by the network device.

In this embodiment, step 304*b* is an optional step. When the first indication information indicates that the first time-frequency resource set exists, and the terminal device can determine the time-frequency domain position of the first time-frequency resource set, the terminal device monitors the first time-frequency resource based on the time-frequency domain position of the first time-frequency resource set. Specifically, after the terminal device determines the time-frequency domain position of the first time-frequency resource set, because the first time-frequency resource set includes a plurality of time-frequency resources, the terminal device monitors the control information at a position of each of the plurality of time-frequency resources, to receive, on the first time-frequency resource, the first control information sent by the network device.

In this embodiment, when the first time-frequency resource set and the second time-frequency resource set are respectively located in consecutive and different symbols in a same slot in time domain, the terminal device can receive at least two pieces of repeated first control information by continuously monitoring the first control information in only one slot (namely, the slot in which the second time-frequency resource set is located), thereby reducing a workload of the terminal device.

In this embodiment, the first indication information sent by the network device to the terminal device not only indicates whether the first time-frequency resource set exists, but can also indicate the time-frequency domain position of the first time-frequency resource set. The terminal device can determine the time-frequency domain position of the first time-frequency resource set based on the first indication information and the time-frequency domain position of the second time-frequency resource set, so that the terminal device can monitor the control channel on each of the first time-frequency resource set and the second time-frequency resource set, to receive the first control information. Therefore, the terminal device may receive two pieces of first control information on different time-frequency resources. In comparison with the conventional technology, the terminal device in the conventional technology can receive one piece of first control information only from the second time-frequency resource. Therefore, the solution provided in this embodiment can effectively improve a probability of correctly receiving the first control information by the terminal device.

Figure 5:
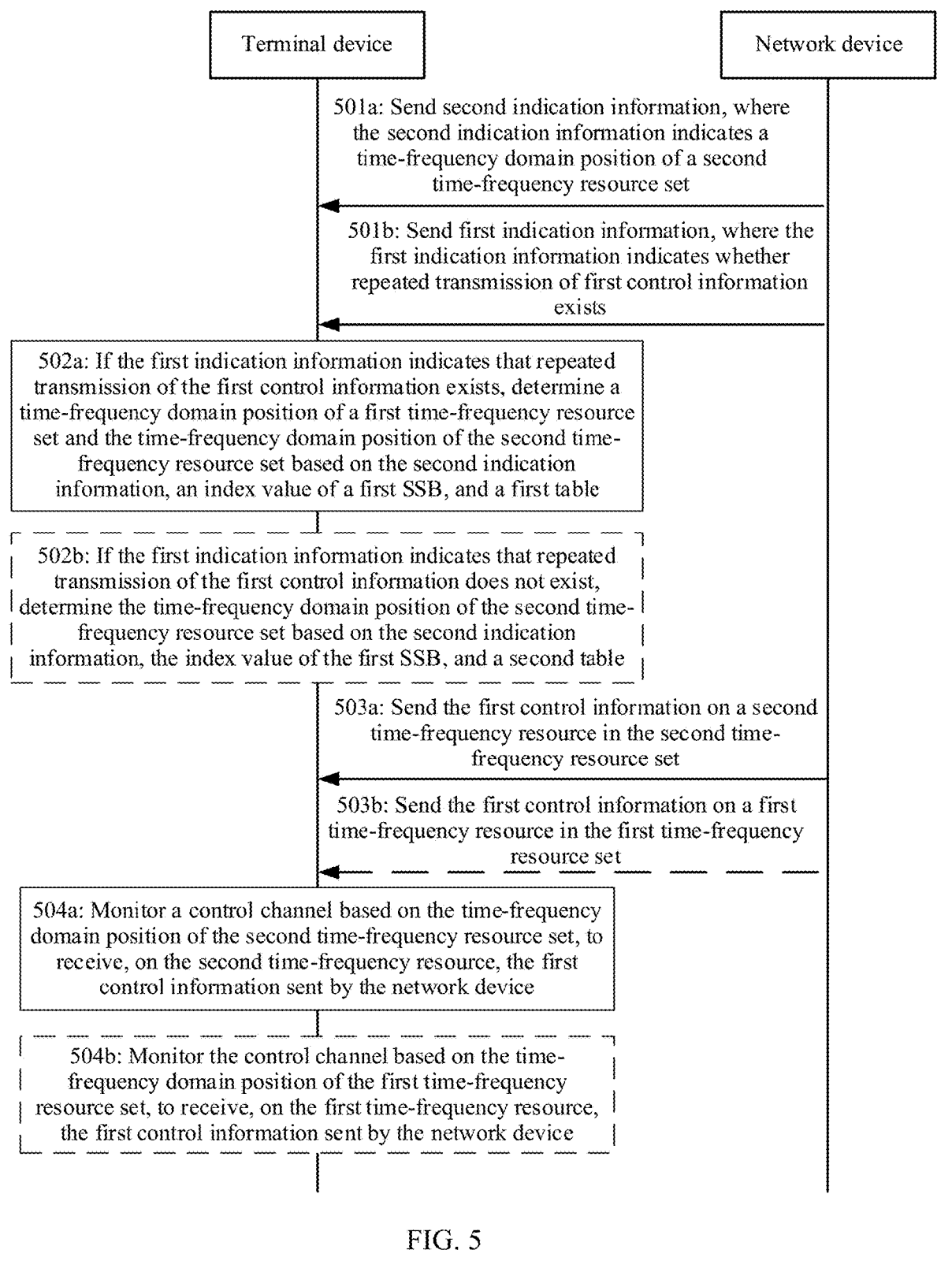

With reference to FIG. 5, the following further describes a control information sending (or receiving) method provided in this application. In this method, first indication information is only used to indicate whether a first time-frequency resource exists (namely, whether repeated transmission of first control information exists), and cannot directly or indirectly indicate a time-frequency domain position of a first time-frequency resource set to which the first time-frequency resource belongs. However, a terminal device can query an updated reference table in this application, to determine the time-frequency domain position of the first time-frequency resource set based on second indication information. Specifically, the terminal device and a network device mainly perform the following steps:

Step 501*a*: The network device sends the second indication information to the terminal device; and correspondingly, the terminal device receives the second indication information from the network device.

The second indication information indicates a time-frequency domain position of a second time-frequency resource set. The second time-frequency resource set includes a plurality of time-frequency resources. The plurality of time-frequency resources include a second time-frequency resource, and the second time-frequency resource is used to transmit the first control information. For details, refer to related descriptions in step 301*a*. Details are not described herein again.

Step 501*b*: The network device sends the first indication information to the terminal device; and correspondingly, the terminal device receives the first indication information from the network device.

The first indication information indicates whether repeated transmission of the first control information exists. It may also be understood that the first indication information indicates whether the first time-frequency resource set exists. It may also be understood that the first indication information indicates whether the first time-frequency resource exists. It may also be understood that the first indication information indicates whether the network device configures, for the terminal device, a time-frequency resource for repeatedly transmitting the first control information. Both the first time-frequency resource set and the second time-frequency resource set may be used to transmit the first control information. In comparison with the second time-frequency resource set, the first time-frequency resource set may be understood as a time-frequency resource set that is additionally configured by the network device for the terminal device and that is used to repeatedly transmit the first control information. Certainly, when the first indication information indicates the first time-frequency resource set exists, it also implicitly indicates that the first time-frequency resource exists in the first time-frequency resource set. When the first indication information indicates that the first time-frequency resource set does not exist, it also implicitly indicates that the first time-frequency resource does not exist.

In actual application, the first indication information may use two different values to indicate whether repeated transmission of the first control information exists or not. For example, one value indicates that repeated transmission of the first control information does not exist, and the other value indicates that repeated transmission of the first control information exists. It may also be understood that the first indication information may use two different values to indicate whether the first time-frequency resource set exists or not. For example, one value indicates that the first time-frequency resource set does not exist, and the other value indicates that the first time-frequency resource set exists.

For example, two values of the first indication information are respectively 0 and 1. When the first indication information is 0, it indicates that the first time-frequency resource set does not exist (that is, repeated transmission of the first control information does not exist). In other words, the network device does not repeatedly send the first control information to the terminal device on the first time-frequency resource in the first time-frequency resource set. In this case, the terminal device may monitor the first control information only on the second time-frequency resource set, instead of monitoring the first control information on the first time-frequency resource set. When the first indication information is 1, it indicates that the first time-frequency resource set exists (that is, repeated transmission of the first control information exists). In other words, the network device repeatedly sends the first control information to the terminal device on the first time-frequency resource in the first time-frequency resource set. In this case, the terminal device may monitor the first control information on both the first time-frequency resource set and the second time-frequency resource set. It should be understood that the foregoing example is merely intended to facilitate understanding of this solution. Alternatively, when the first indication information is 1, it indicates that the first time-frequency resource set does not exist (that is, repeated transmission of the first control information does not exist); or when the first indication information is 0, it indicates that the first time-frequency resource set exists (that is, repeated transmission of the first control information exists). In addition, another number may be used to distinguish between the two states: existent and not existent. This is not specifically limited herein.

It should be understood that, before the network device sends the first indication information to the terminal device, the network device determines, based on one or more related factors, whether the first indication information sent to the terminal device indicates that the first time-frequency resource set exists (that is, indicates that repeated transmission of the first control information exists) or indicates that the first time-frequency resource set does not exist (that is, indicates that repeated transmission of the first control information does not exist), which may be also understood as whether the network device configures the first time-frequency resource set for the terminal device. The foregoing related factors include but are not limited to a distance between the network device and the terminal device, quality of communication between the network device and the terminal device, or the like. For details, refer to related descriptions in step 301*b*. Details are not described herein again.

It should be understood that there is no limitation on a time sequence between step 501*a* and step 501*b*. The network device may first perform step 501*a* and then perform step 501*b*, or the network device may first perform step 501*b* and then perform step 501*a*, or the network device may simultaneously perform step 501*a* and step 501*b*. This is not specifically limited herein.

In an optional implementation, when the network device simultaneously performs step 501*a* and step 501*b*, the network device may encapsulate the first indication information and the second indication information into a message (referred to as a first message below) that carries a master information block MIB. Optionally, the second indication information is encapsulated in the master information block MIB, and the first indication information is encapsulated in a payload of the first message outside the master information block MIB. When the terminal device receives the first message that carries the first indication information and the second indication information, the terminal device may determine, based on the first indication information, whether the first time-frequency resource set exists (namely, whether repeated transmission of the first control information exists in the first indication information), and then determine the time-frequency domain position of the first time-frequency resource set based on the second indication information. For details, refer to the following related descriptions in step 502*a* and step 502*b*.

Optionally, the first indication information may be encapsulated in a payload of a PBCH (PBCH payload). In an optional implementation, the first indication information may be carried in a reserved bit $\bar{a}_{\bar{A}+6}$ in the payload of the PBCH. In another optional implementation, the first indication information may be carried in reserved bits $\bar{a}_{\bar{A}+6}$ and $\bar{a}_{\bar{A}+7}$ in the payload of the PBCH.

In an optional implementation, when the network device simultaneously performs step 501*a* and step 501*b*, the network device may also encapsulate the first indication information and the second indication information into different messages, and send the first indication information and the second indication information to the terminal device by using the different messages. For ease of description, the network device encapsulates the first indication information in a second message, and encapsulates the second indication information in a third message. Optionally, there is an association relationship between the second message and the third message, so that the terminal device can learn that when determining the time-frequency domain position of the first time-frequency resource set indicated by the first indication information in the second message, the terminal device needs to use the time-frequency domain position of the second time-frequency resource set indicated by the second indication information in the third message. For example, the second message and the third message have a same identifier. When the terminal device receives the second message and the third message, the terminal device may determine, by using the identifier, that the second message is associated with the third message.

In addition, the first indication information may be included in a physical broadcast channel PBCH. That is, the network device sends the first indication information to the terminal device by using the physical broadcast channel PBCH. Optionally, the physical broadcast channel PBCH may be a periodic broadcast PBCH. For example, the terminal device may periodically blindly detect a synchronization signal/broadcast channel block SSB, to obtain a PBCH in the SSB, and then obtain the second indication information from the PBCH.

For example, the first time-frequency resource may be a time-frequency resource carrying a physical downlink control channel PDCCH. The first control information may be downlink control information DCI, sidelink control information, or the like. This is not specifically limited herein.

For example, the first time-frequency resource set may be a time-frequency resource set occupied by a type 0 physical downlink control channel PDCCH (Type0-PDCCH). That is, the time-frequency domain position of the first time-frequency resource set is a time-frequency domain position of the time-frequency resource set occupied by the type 0 PDCCH. Alternatively, the first time-frequency resource set may be a time-frequency resource set occupied by a type 1 physical downlink control channel PDCCH (Type0-PDCCH). That is, the time-frequency domain position of the first time-frequency resource set is a time-frequency domain position of the time-frequency resource set occupied by the type 1 PDCCH. This is not specifically limited herein. The time-frequency resource set may be specifically represented as a control resource set CORESET, or may be represented as a set of time-frequency resources carrying a control channel candidate set (namely, PDCCH candidates), or may be represented as another type of time-frequency resource unit. This is not specifically limited herein.

In addition, when the first indication information indicates that the first time-frequency resource set exists (that is, the first indication information indicates that repeated transmission of the first control information exists), the terminal device performs steps 502*a* and 504*b*, and the network device also performs step 503*b*. When the first indication information indicates that the first time-frequency resource set does not exist, the terminal device does not perform steps 502*a* and 504*b*, and the network device does not perform step 503*b* either.

Step 502*a*: If the first indication information indicates that repeated transmission of the first control information exists, the terminal device determines the time-frequency domain position of the first time-frequency resource set and the time-frequency domain position of the second time-frequency resource set based on the second indication information, an index value of a first SSB, and a first table.

Specifically, the terminal device searches the first table based on the second indication information to determine the time-frequency domain position of the first time-frequency resource set. The first table searched by the terminal device is a newly defined reference table, and values of some parameters are added to the newly defined reference table based on a reference table in the conventional technology (namely, Table 13-11 in the protocol 38.213 or Table 13-12 in the protocol 38.213), so that the first table not only includes parameters for determining the time-frequency domain position of the second time-frequency resource set, but also includes parameters for determining the time-frequency position of the first time-frequency resource set.

In a possible implementation, a value of a first parameter is added to the first table based on the reference table in the conventional technology, and the first parameter is an index value of a first symbol (first symbol index), and indicates an index value of a first symbol of a slot in a monitoring window of the time-frequency resource set. The value of the first parameter includes an index value of a first symbol corresponding to the second time-frequency resource set and an index value of a first symbol corresponding to the first time-frequency resource set. However, in the conventional technology, the reference table includes only the index value of the first symbol corresponding to the second time-frequency resource set.

Optionally, a previous value of two values of the first parameter may be defined as the index value of the first symbol corresponding to the second time-frequency resource set, and a next value may be defined as the index value of the first symbol corresponding to the first time-frequency resource set. Alternatively, a previous value of two values of the first parameter may be defined as the index value of the first symbol corresponding to the first time-frequency resource set, and a next value may be defined as the index value of the first symbol corresponding to the second time-frequency resource set. This is not specifically limited herein. For ease of description, an example in which the previous value is the index value of the first symbol corresponding to the second time-frequency resource set, and the next value is the index value of the first symbol corresponding to the first time-frequency resource set is used below for description.

A manner of representing the index value of the first symbol corresponding to the second time-frequency resource set is the same as a manner of representing the index value of the first symbol in the conventional technology. The index value of the first symbol in the first time-frequency resource set is determined based on a quantity of symbols in the first time-frequency resource set or is 0. For example, the index value of the first symbol in the first time-frequency resource set may be $$N_{symb}^{CORESET},\ -N_{symb}^{CORESET},\ 0,\ (N_{symb}^{CORESET}+1),\ (N_{symb}^{CORESET}+2),$$

or the like.

For example, when the index value of the first symbol in the second time-frequency resource set is "0", and the index value of the first symbol in the first time-frequency resource set is $$"N_{symb}^{CORESET}"$$

(namely, the quantity of symbols in the first time-frequency resource set), the first time-frequency resource set and the second time-frequency resource set are located in different slots in time domain, and a slot in which the second time-frequency resource set is located is before a slot in which the first time-frequency resource set is located. "0" indicates that a symbol in which the second time-frequency resource set is located is in a first symbol in the slot.

$$"N_{symb}^{CORESET}"$$

indicates that the slot in which the first time-frequency resource set is located is in a next slot of the slot in which the second time-frequency resource set is located, and a quantity of symbols in the first time-frequency resource set in a corresponding slot (namely, the next slot) is the same as a quantity of symbols in the second time-frequency resource set in a corresponding slot (namely, a previous slot). For example, if formula 1 obtains through calculation that the second time-frequency resource is located in a slot whose index CORESET value is 0 (namely, a slot 0), when the value of the first parameter is $$"0\&N_{symb}^{CORESET}",$$

it indicates that the second time-frequency resource set is located in a symbol whose index value is 0 in the slot 0, and the first time-frequency resource set is located in a symbol whose index value is 0 in a slot 1.

For example, when the index value of the first symbol in the second time-frequency resource set is "0", and the index value of the first symbol in the first time-frequency resource set is $$"-N_{symb}^{CORESET}"$$

(namely, an opposite number of the quantity of symbols in the first time-frequency resource set), the first time-frequency resource set and the second time-frequency resource set are located in different slots in time domain, and a slot in which the first time-frequency resource set is located is before a slot in which the second time-frequency resource set is located. "0" indicates that a symbol in which the second time-frequency resource set is located is in a first symbol in the slot.

$$"-N_{symb}^{CORESET}"$$

indicates that the slot in which the first time-frequency resource set is located is in a previous slot of the slot in which the second time-frequency resource set is located, and a quantity of symbols in the first time-frequency resource set in a corresponding slot (namely, the previous slot) is the same as a quantity of symbols in the second time-frequency resource set in a corresponding slot (namely, a next slot). For example, if formula 1 obtains through calculation that the second time-frequency resource is located in a slot whose index value is 1 (namely, a slot 1), when the value of the first parameter is $$"0\&-N_{symb}^{CORESET}",$$

it indicates that the second time-frequency resource set is located in a symbol whose index value is 0 in the slot 1, and the first time-frequency resource set is located in a symbol whose index value is 0 in a slot 0.

For example, when the index value of the first symbol in the second time-frequency resource set is "1", and the index value of the first symbol in the first time-frequency resource set is $$"(N_{symb}^{CORESET}+1)"$$

(namely, the quantity of symbols in the first time-frequency resource set), the first time-frequency resource set and the second time-frequency resource set are located in different slots in time domain. Optionally, the slot in which the second time-frequency resource set is located is before the slot in which the first time-frequency resource set is located. "1" indicates that a symbol in which the second time-frequency resource set is located is in a second symbol in the slot, namely, a symbol whose index value is 1 in the slot.

$$"(N_{symb}^{CORESET}+1)"$$

indicates that the slot in which the first time-frequency resource set is located is in a next slot of the slot in which the second time-frequency resource set is located, and a quantity of symbols in the first time-frequency resource set in a corresponding slot (namely, the next slot) is the same as a quantity of symbols in the second time-frequency resource set in a corresponding slot (namely, a previous slot), and index values of these symbols are all 1. For example, if formula 1 obtains through calculation that the second time-frequency resource is located in a slot whose index value is 0 (namely, a slot 0), when the value of the first parameter is $$"1\&\ (N_{symb}^{CORESET}+1)",$$

it indicates that the second time-frequency resource set is located in a symbol whose index value is 1 in the slot 0, and the first time-frequency resource set is located in a symbol whose index value is 1 in a slot 1.

For example, when the index value of the first symbol in the second time-frequency resource set is "2", and the index value of the first symbol in the first time-frequency resource set is $$"(N_{symb}^{CORESET}+2)"$$

(namely, the quantity of symbols in the first time-frequency resource set), the first time-frequency resource set and the second time-frequency resource set are located in different slots in time domain. Optionally, the slot in which the second time-frequency resource set is located is before the slot in which the first time-frequency resource set is located. "2" indicates that a symbol in which the second time-frequency resource set is located is in a third symbol in the slot, namely, a symbol whose index value is 2 in the slot.

$$"(N_{symb}^{CORESET}+2)"$$

indicates that the slot in which the first time-frequency resource set is located is in a next slot of the slot in which the second time-frequency resource set is located, and a quantity of symbols in the first time-frequency resource set in a corresponding slot (namely, the next slot) is the same as a quantity of symbols in the second time-frequency resource set in a corresponding slot (namely, a previous slot), and index values of these symbols are all 2. For example, if formula 1 obtains through calculation that the second time-frequency resource is located in a slot whose index value is 0 (namely, a slot 0), when the value of the first parameter is $$"2\&\ (N_{symb}^{CORESET}+2)",$$

it indicates that the second time-frequency resource set is located in a symbol whose index value is 2 in the slot 0, and the first time-frequency resource set is located in a symbol whose index value is 2 in a slot 1.

It should be understood that, in actual application, another number or character may be further defined to represent a time domain position relationship between the two time-frequency resource sets. Details are not listed herein.

Optionally, the first table further includes an index value for determining the value of the first parameter. Each row in the first table has an index value corresponding to the row, and different rows have different index values. The terminal device can determine a first index value based on the second indication information. The first index value corresponds to an index value of a first symbol in a monitoring window of the first time-frequency resource set, and the first index value corresponds to an index value of a first symbol in a monitoring window of the second time-frequency resource set. In this case, the terminal device may obtain two index values (namely, the index value of the first symbol in the monitoring window of the first time-frequency resource set and the index value of the first symbol in the monitoring window of the second time-frequency resource set) about the first symbol in one table lookup operation by querying the first table based on the first index value. However, in the conventional technology, only one index value of the first symbol (namely, the index value of the first symbol in the monitoring window of the second time-frequency resource set) can be found based on the first index value determined based on the second indication information. Therefore, the solution provided in this embodiment helps reduce a quantity of times that the terminal device queries a reference table, and helps the terminal device quickly determine the time domain position of the first time-frequency resource set and the time domain position of the second time-frequency resource set.

For example, a newly defined reference table (namely, the first table) provided in this application may be shown in Table 4-1 and Table 4-2.

Table 4-1 is a newly defined reference table obtained based on a reference table 13-11 (Table 13-11), and indicates parameters for determining monitoring occasions of a PDCCH when a pattern type is pattern 1 and a radio frequency type is FR1, namely, parameters for PDCCH monitoring occasions for Type0-PDCCH CSS set-SS/PBCH block and CORESET multiplexing pattern 1 and FR1.

Table 4-2 is a newly defined reference table obtained based on a reference table 13-12 (Table 13-12), and indicates parameters for determining monitoring occasions of a PDCCH when a pattern type is pattern 1 and a radio frequency type is FR2, namely, parameters for PDCCH monitoring occasions for Type0-PDCCH CSS set-SS/PBCH block and CORESET multiplexing pattern 1 and FR2.

TABLE 4-1

| Index value of a search space 0 (Index) | O | Quantity of slots in each search space set (Number of search space sets per slot) | M | Index value of the first symbol in the monitoring window (First symbol index) |
|---|---|---|---|---|
| 0 | 0 | 1 | 1 | $0 \& N_{symb}^{CORESET}$ |
| 1 | 0 | 2 | ½ | $\{0 \& N_{symb}^{CORESET}$, if $i$ is even$\}$, $\{N_{symb}^{CORESET} \& 0$, if $i$ is odd$\}$ |
| 2 | 2 | 1 | 1 | $0 \& N_{symb}^{CORESET}$ |
| 3 | 2 | 2 | ½ | $\{0 \& N_{symb}^{CORESET}$, if $i$ is even$\}$, $\{N_{symb}^{CORESET} \& 0$, if $i$ is odd$\}$ |
| 4 | 5 | 1 | 1 | $0 \& N_{symb}^{CORESET}$ |
| 5 | 5 | 2 | ½ | $\{0 \& N_{symb}^{CORESET}$, if $i$ is even$\}$, $\{N_{symb}^{CORESET} \& 0$, if $i$ is odd$\}$ |
| 6 | 7 | 1 | 1 | $0 \& N_{symb}^{CORESET}$ |
| 7 | 7 | 2 | ½ | $\{0 \& N_{symb}^{CORESET}$, if $i$ is even$\}$, $\{N_{symb}^{CORESET} \& 0$, if $i$ is odd$\}$ |
| 8 | 0 | 1 | 2 | $0 \& N_{symb}^{CORESET}$ |
| 9 | 5 | 1 | 2 | $0 \& N_{symb}^{CORESET}$ |
| 10 | 0 | 1 | 1 | $1 \& (N_{symb}^{CORESET} + 1)$ |
| 11 | 0 | 1 | 1 | $2 \& (N_{symb}^{CORESET} + 2)$ |
| 12 | 2 | 1 | 1 | $1 \& (N_{symb}^{CORESET} + 1)$ |
| 13 | 2 | 1 | 1 | $2 \& (N_{symb}^{CORESET} + 2)$ |
| 14 | 5 | 1 | 1 | $1 \& (N_{symb}^{CORESET} + 1)$ |
| 15 | 5 | 1 | 1 | $2 \& (N_{symb}^{CORESET} + 2)$ |

TABLE 4-2

| Index value of a search space 0 (Index) | O | Quantity of slots in each search space set (Number of search space sets per slot) | M | Index value of the first symbol in the monitoring window (First symbol index) |
|---|---|---|---|---|
| 0 | 0 | 1 | 1 | $0 \& N_{symb}^{CORESET}$ |
| 1 | 0 | 2 | ½ | $\{0 \& N_{symb}^{CORESET}$, if $i$ is even$\}$, $\{N_{symb}^{CORESET} \& 0$, if $i$ is odd$\}$ |
| 2 | 2.5 | 1 | 1 | $0 \& N_{symb}^{CORESET}$ |
| 3 | 2.5 | 2 | ½ | $\{0 \& 7$, if $i$ is even$\}$, $\{7 \& 0$, if $i$ odd$\}$ |
| 4 | 5 | 1 | 1 | $0 \& N_{symb}^{CORESET}$ |
| 5 | 5 | 2 | ½ | $\{0 \& 7$, if $i$ is even$\}$, $\{7 \& 0$, if $i$ odd$\}$ |
| 6 | 0 | 2 | ½ | $\{0 \& N_{symb}^{CORESET}$, if $i$ is even$\}$, $\{N_{symb}^{CORESET} \& 0$, if $i$ is odd$\}$ |

TABLE 4-2-continued

| Index value of a search space 0 (Index) | O | Quantity of slots in each search space set (Number of search space sets per slot) | M | Index value of the first symbol in the monitoring window (First symbol index) |
|---|---|---|---|---|
| 7 | 2.5 | 2 | ½ | $\{0 \,\&\, N_{symb}^{CORESET}$, if $i$ is even$\}$, $\{N_{symb}^{CORESET} \,\&\, 0$, if $i$ is odd$\}$ |
| 8 | 5 | 2 | ½ | $\{0 \,\&\, N_{symb}^{CORESET}$, if $i$ is even$\}$, $\{N_{symb}^{CORESET} \,\&\, 0$, if $i$ is odd$\}$ |
| 9 | 7.5 | 1 | 1 | $0 \,\&\, N_{symb}^{CORESET}$ |
| 10 | 7.5 | 2 | ½ | {0 & 7, if $i$ is even}, {7 & 0, if $i$ odd} |
| 11 | 7.5 | 2 | ½ | $\{0 \,\&\, N_{symb}^{CORESET}$, if $i$ is even$\}$, $\{N_{symb}^{CORESET} \,\&\, 0$, if $i$ is odd$\}$ |
| 12 | 0 | 1 | 2 | $0 \,\&\, N_{symb}^{CORESET}$ |
| 13 | 5 | 1 | 2 | $0 \,\&\, N_{symb}^{CORESET}$ |
| 14 | | | Reserved | |
| 15 | | | Reserved | |

Optionally, the terminal device may determine, based on the second indication information, an index value for querying the first table, and then the terminal device queries the first table based on the index value, to obtain a parameter for determining the time-frequency domain position of the second time-frequency resource set and a parameter for determining the time-frequency domain position of the first time-frequency resource set. Then, the terminal device determines the time-frequency domain position of the second time-frequency resource set based on the index value of the first SSB and the parameter for determining the time-frequency domain position of the second time-frequency resource set. In addition, the terminal device determines the time-frequency domain position of the first time-frequency resource set based on the index value of the first SSB and the parameter for determining the time-frequency domain position of the first time-frequency resource set.

Optionally, the second indication information may determine two index values, where one index value is used to determine a frequency domain range of the second time-frequency resource set, and the other index value is used to determine a time domain range (namely, the first index value) of the second time-frequency resource set. For example, first four bits of the second indication information are used as an index value, and are used to query, in a reference table (for example, a reference table 13-1 (namely, Table 13-1 in the protocol 38.213) in the conventional technology), a parameter for determining the frequency domain range of the second time-frequency resource set and a parameter for determining a frequency domain range of the first time-frequency resource set. Last four bits of the second indication information are used as an index value (namely, the first index value), and are used to query, in the first table (for example, Table 4-1 or Table 4-2), a parameter for determining the time domain range of the second time-frequency resource set and a parameter for determining a time domain range of the first time-frequency resource set. Specifically, the terminal device may calculate the time domain position of the first time-frequency resource set and the time domain position of the second time-frequency resource set based on formula 1. A manner of calculating the time domain position of the first time-frequency resource set by the terminal device is similar to the foregoing process of calculating the time domain position of the second time-frequency resource set. For details, refer to related descriptions in step 302*a*. Details are not described herein again.

Optionally, the frequency domain position of the first time-frequency resource set is the same as the frequency domain position of the second time-frequency resource set.

Step 502*b*: If the first indication information indicates that repeated transmission of the first control information does not exist, determine the time-frequency domain position of the second time-frequency resource set based on the second indication information, the index value of the first SSB, and a second table.

Optionally, the terminal device may determine, based on the second indication information, an index value for querying a reference table, and then the terminal device queries a reference table (namely, the second table) in the conventional technology based on the index value, to obtain a parameter for determining the time-frequency domain position of the second time-frequency resource set. Then, the terminal device determines the time-frequency domain position of the second time-frequency resource set based on the index value of the first SSB and the parameter for determining the time-frequency domain position of the second time-frequency resource set.

Optionally, the second indication information may determine two index values, where one index value is used to determine a frequency domain range of the second time-frequency resource set, and the other index value is used to determine a time domain range of the second time-frequency resource set. For example, first several bits of the second indication information are used as an index value, and are used to query, in a reference table (for example, a reference table 13-1 (namely, Table 13-1 in the protocol 38.213) in the conventional technology), a parameter for determining the frequency domain range of the second time-frequency resource set. Last several bits of the second indication information are used as an index value, and are used to query, in a reference table (for example, a reference table 13-11 (namely, Table 13-11 in the protocol 38.213) (or a reference table 13-12 (namely, Table 13-12 in the protocol 38.213))) in the conventional technology, a parameter for determining the time domain range of the second time-frequency resource set.

Specifically, the terminal device determines the first index value based on the second indication information, and then queries, by using the first index value, the second table for the parameter for determining the time domain position of the second time-frequency resource set. Then, the terminal device determines the time domain position of the second time-frequency resource set based on the index value of the first SSB and the parameter that is in the second table and that is used to determine the time domain position of the second time-frequency resource set.

Specifically, refer to related descriptions in step 302*a*. Details are not described herein again.

Step 503*a*: The network device sends the first control information to the terminal device on the second time-frequency resource in the second time-frequency resource set.

Step 503*b*: The network device sends the first control information to the terminal device on the first time-frequency resource in the first time-frequency resource set.

In this embodiment, step 503*b* is an optional step. When the first indication information sent by the network device to the terminal device indicates that repeated transmission of the first control information exists (that is, the first indication information indicates that the first time-frequency resource set exists), the network device may perform step 503*b*.

Step 504*a*: The terminal device monitors the second time-frequency resource based on the time-frequency domain position of the second time-frequency resource set, to receive, on the second time-frequency resource, the first control information sent by the network device.

Step 504*b*: The terminal device monitors the first time-frequency resource based on the time-frequency domain position of the first time-frequency resource set, to receive, on the first time-frequency resource, the first control information sent by the network device.

In this embodiment, step 504*b* is an optional step. When the first indication information indicates that repeated transmission of the first control information exists (that is, the first indication information indicates that the first time-frequency resource set exists), the terminal device determines the time-frequency domain position of the first time-frequency resource set. In this case, the terminal device may perform step 504*b*.

In this embodiment, step 503*a*, step 503*b*, step 504*a*, and step 504*b* are similar to step 303*a*, step 303*b*, step 304*a*, and step 304*b* in the foregoing. Details are not described herein again.

In this embodiment, the first indication information sent by the network device to the terminal device is only used to indicate whether repeated transmission of the first control information exists (namely, whether the first time-frequency resource set exists). The terminal device can query a newly defined reference table (namely, the first table) based on the second indication information to determine the time-frequency domain position of the first time-frequency resource set and the time-frequency domain position of the second time-frequency resource set, so that the terminal device may monitor the control channel on each of the first time-frequency resource set and the second time-frequency resource set, to receive the first control information. Therefore, the terminal device may receive two pieces of first control information on different time-frequency resources. In comparison with the conventional technology, the terminal device in the conventional technology can receive one piece of first control information only from the second time-frequency resource. Therefore, the solution provided in this embodiment can effectively improve a probability of correctly receiving the first control information by the terminal device.

Figure 6:
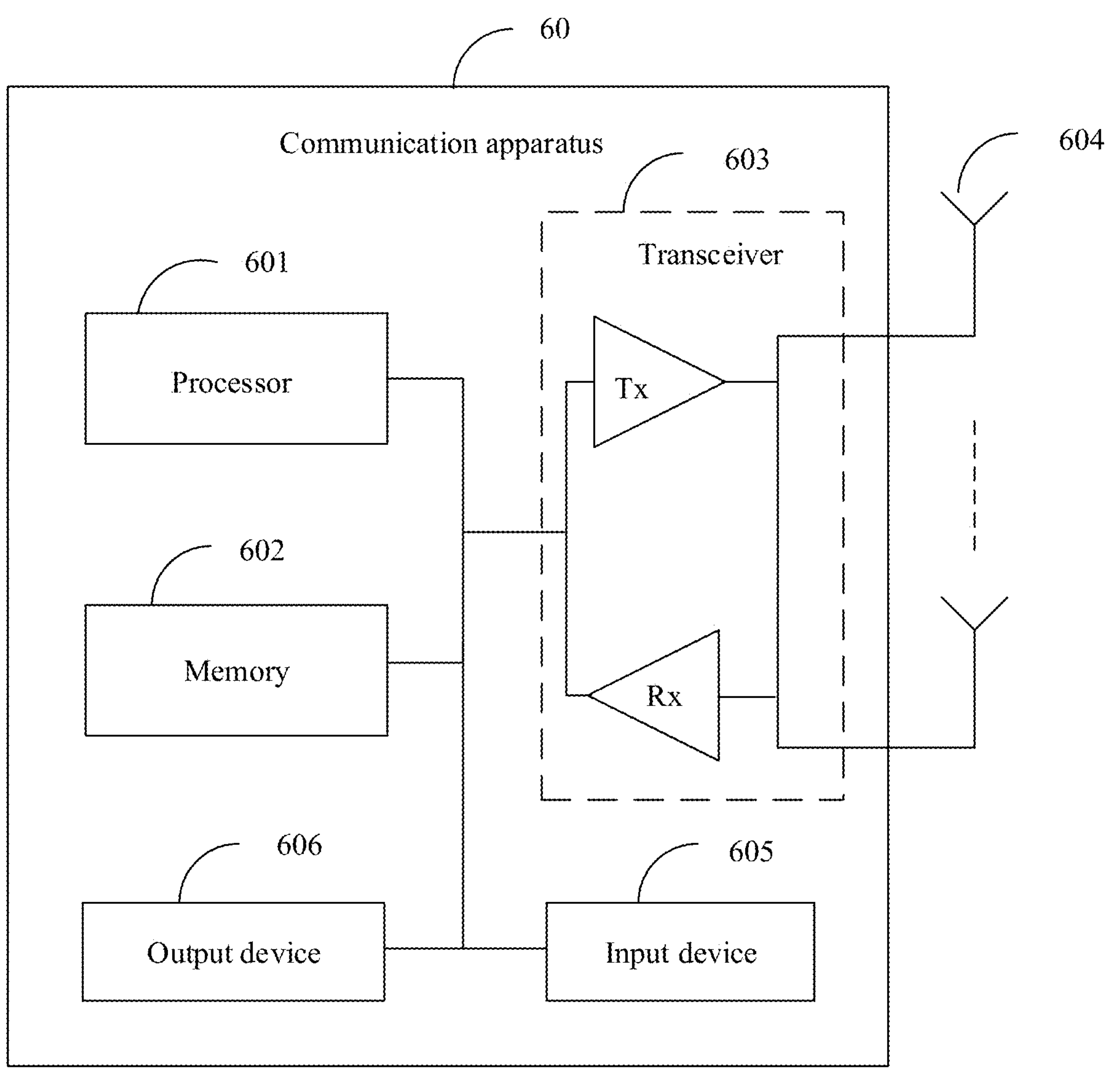
FIG. 6 is a schematic diagram of an embodiment of a communication apparatus according to this application.

FIG. 6 is a schematic diagram of a structure of a communication apparatus 60 according to an embodiment. It should be understood that a terminal device in the method embodiments corresponding to FIG. 2A, FIG. 2B, FIG. 3, and FIG. 5 may be based on a structure of the communication apparatus 60 shown in FIG. 6 in this embodiment.

The communication apparatus 60 includes at least one processor 601, at least one memory 602, and at least one transceiver 603. The processor 601, the memory 602, and the transceiver 603 are connected. Optionally, the communication apparatus 60 may further include an input device 605, an output device 606, and one or more antennas 604. The antenna 604 is connected to the transceiver 603, and the input device 605 and the output device 606 are connected to the processor 601.

In this embodiment, the memory 602 is mainly configured to store a software program and data. The memory 602 may exist independently, and is connected to the processor 601. Optionally, the memory 602 may be integrated with the processor 601, for example, integrated into one or more chips. The memory 602 can store program code for executing the technical solutions in embodiments of this application, and the processor 601 controls the execution. Various types of executed computer program code may also be considered as drivers of the processor 601. It should be understood that FIG. 6 in this embodiment shows only one memory and one processor. However, in actual application, the communication apparatus 60 may include a plurality of processors or a plurality of memories. This is not specifically limited herein. In addition, the memory 602 may also be referred to as a storage medium, a storage device, or the like. The memory 602 may be a storage element (namely, an on-chip storage element) located on a same chip as the processor, or an independent storage element. This is not limited in embodiments of this application.

In this embodiment, the transceiver 603 may be configured to support receiving or sending of a radio frequency signal between the communication apparatus 60 and an access network device, and the transceiver 603 may be connected to the antenna 604. The transceiver 603 includes a transmitter Tx and a receiver Rx. Specifically, the one or more antennas 604 may receive a radio frequency signal. The receiver Rx of the transceiver 603 is configured to: receive the radio frequency signal from the antenna 604, convert the radio frequency signal into a digital baseband signal or a digital intermediate frequency signal, and provide the digital baseband signal or the digital intermediate frequency signal for the processor 601, so that the processor 601 performs further processing on the digital baseband signal or the digital intermediate frequency signal, for example, performs demodulation processing and decoding processing. In addition, the transmitter Tx of the transceiver 603 is further configured to: receive a modulated digital baseband signal or a modulated digital intermediate frequency signal from the processor 601, convert the modulated digital baseband signal or the modulated digital intermediate frequency signal into a radio frequency signal, and send the radio frequency signal through the one or more antennas 604. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

It should be understood that the transceiver 603 may also be referred to as a transceiver unit, a transceiver machine, a transceiver apparatus, or the like. Optionally, a device that is configured to implement a receiving function and that is in the transceiver unit may be considered as a receiving unit, and a device that is configured to implement a sending function and that is in the transceiver unit may be considered as a sending unit. In other words, the transceiver unit includes the receiving unit and the sending unit. The receiving unit may also be referred to as a receiver, an input port, a receiver circuit, or the like. The sending unit may be referred to as a transmitter, transmitter machine, a transmitter circuit, or the like.

The processor 601 may be a baseband processor, or may be a central processing unit (CPU). The baseband processor and the CPU may be integrated together or separated. The processor 601 may be configured to implement various functions for the terminal device, for example, configured to process a communication protocol and communication data, or configured to control an entire terminal device, execute a software program, and process data of the software program, or configured to assist in completing a computing processing task, for example, graphics and image processing or audio processing. Alternatively, the processor 601 is configured to implement one or more of the foregoing functions.

In addition, the output device 606 communicates with the processor 601, and may display information in a plurality of manners. This is not specifically limited herein.

In a possible implementation, the communication apparatus 60 is configured to perform the method in the embodiment corresponding to FIG. 2A or FIG. 3. In this case, the transceiver 603 in the communication apparatus 60 is configured to receive first indication information from a network device before the communication apparatus 60 is in a connected state, where the first indication information indicates a first time-frequency resource set, and the first time-frequency resource set and a second time-frequency resource set are used to transmit first control information. The processor 601 is configured to determine a time domain position of the first time-frequency resource set based on the first indication information. In addition, the transceiver 603 is further configured to receive the first control information on each of the first time-frequency resource set and the second time-frequency resource set before being in the connected state. Optionally, the first control information is used to schedule a system information block SIB 1; or the first control information is control information scrambled by a system information radio network temporary identifier SI-RNTI.

In an optional implementation, the first indication information indicates a time domain position of the first time-frequency resource set. The transceiver 603 is further configured to determine the time domain position of the first time-frequency resource set based on the first indication information.

In an optional implementation, the processor 601 in the communication apparatus 60 is configured to determine the time domain position of the first time-frequency resource set based on the first indication information and an index value of a first synchronization signal block SSB, where both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set. The processor 601 is specifically configured to: determine the time domain position of the second time-frequency resource set based on second indication information and the index value of the first SSB, where the second indication information indicates the time domain position of the second time-frequency resource set; and determine the time domain position of the first time-frequency resource set based on the first indication information and the time domain position of the second time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

In a possible implementation, the communication apparatus 60 is configured to perform the method in the embodiment corresponding to FIG. 2B or FIG. 5. In this case, the transceiver 603 in the communication apparatus 60 is configured to receive the first indication information before the communication apparatus 60 is in the connected state, where the first indication information indicates whether repeated transmission of the first control information exists. The processor 601 is configured to: determine, based on the first indication information, whether repeated transmission of the first control information exists; and when the first indication information indicates that repeated transmission of the first control information exists, determine the time domain position of the first time-frequency resource set and the time domain position of the second time-frequency resource set based on a first table. The transceiver 603 in the communication apparatus 60 is further configured to receive the first control information on each of the first time-frequency resource set and the second time-frequency resource set before the communication apparatus 60 is in the connected state.

In a possible implementation, the first control information is used to schedule a system information block SIB 1; or the first control information is control information scrambled by a system information radio network temporary identifier SI-RNTI.

In a possible implementation, the first indication information is located in a first message, the first message further includes a master information block MIB carrying second indication information, and the second indication information indicates the time domain position of the second time-frequency resource set. The processor 601 is specifically configured to determine the time domain position of the first time-frequency resource set and the time domain position of the second time-frequency resource set based on the second indication information, an index value of a first synchronization signal block SSB, and the first table.

In a possible implementation, the first table includes an index value of a first symbol in a monitoring window of the first time-frequency resource set and an index value of a first symbol in a monitoring window of the second time-frequency resource set.

In a possible implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In a possible implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 & $N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

For others, refer to the method of the terminal device in the foregoing embodiments. Details are not described herein again.

Figure 7:
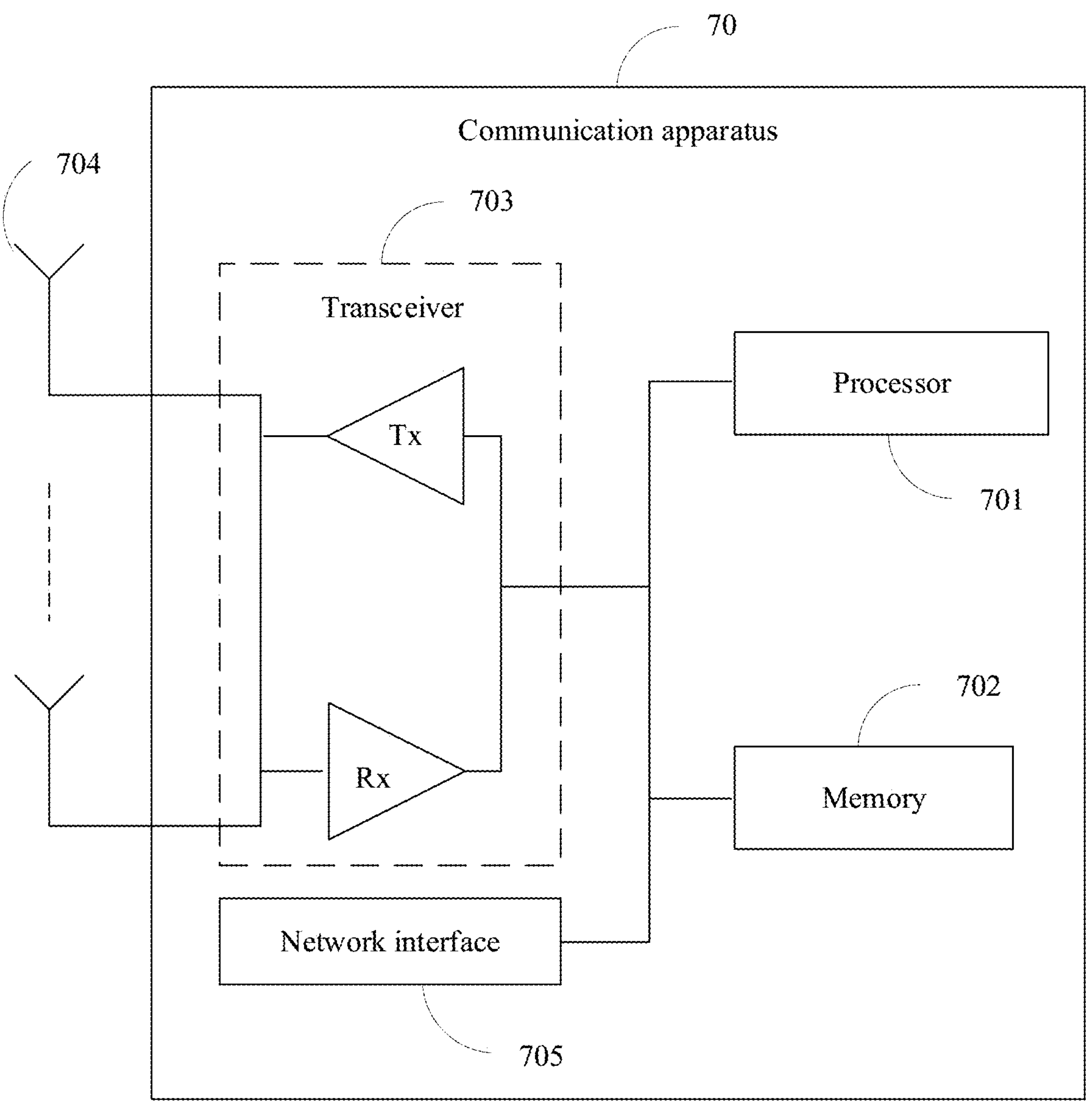
FIG. 7 is a schematic diagram of another embodiment of a communication apparatus according to this application.

FIG. 7 is a schematic diagram of a structure of another communication apparatus 70 according to an embodiment. It should be understood that a network device in the method embodiments corresponding to FIG. 2A, FIG. 2B, FIG. 3, and FIG. 5 may be based on a structure of the communication apparatus 70 shown in FIG. 7 in this embodiment. It should be further understood that, when an access network device or a base station of a subsequently evolved standard performs the method in embodiments of this application, an access network or the base station of the subsequently evolved standard may alternatively use the structure of the communication apparatus 70 shown in FIG. 7 in this embodiment.

The communication apparatus 70 includes at least one processor 701, at least one memory 702, at least one transceiver 703, at least one network interface 704, and one or more antennas 705. The processor 701, the memory 702, the transceiver 703, and the network interface 705 are connected by using a connection apparatus, and the antenna 704 is connected to the transceiver 703. The connection apparatus may include various types of interfaces, transmission cables, buses, or the like. This is not limited in this embodiment.

The network interface 705 is configured to enable the communication apparatus 70 to connect to another communication apparatus through a communication link. Specifically, the network interface 705 may include a network interface such as an SI interface between the communication apparatus 70 and a core network element. The network interface 705 may also include a network interface such as an X2 or Xn interface between the communication apparatus 70 and another network device (for example, another access network device or another core network element).

For the transceiver 703, the memory 702, and the antenna 704, refer to related descriptions of the transceiver 603, the memory 602, and the antenna 604 in the embodiment corresponding to FIG. 6. Details are not described herein again.

In addition, the processor 701 is mainly configured to process a communication protocol and communication data, control an entire network device, execute a software program, and process data of the software program, for example, configured to support the communication apparatus 70 in performing actions described in the foregoing method embodiments. The communication apparatus 70 may include a baseband processor and a central processing unit. The baseband processor is mainly configured to process the communication protocol and the communication data. The central processing unit is mainly configured to control the entire communication apparatus 70, execute the software program, and process the data of the software program. The processor 701 in FIG. 7 may integrate functions of the baseband processor and the central processing unit. A person skilled in the art may understand that the baseband processor and the central processing unit may alternatively be processors independent of each other, and are interconnected by using a technology such as a bus. A person skilled in the art may understand that the communication apparatus 70 may include a plurality of baseband processors to adapt to different network standards, the communication apparatus 70 may include a plurality of central processing units to improve a processing capability of the communication apparatus 70, and various components of the communication apparatus 70 may be connected by using various buses. The baseband processor may alternatively be expressed as a baseband processing circuit or a baseband processing chip. The central processing unit may also be expressed as a central processing circuit or a central processing chip. The function of processing a communication protocol and communication data may be built into the processor; or may be stored in the memory in a form of a software program, so that the processor executes the software program to implement the baseband processing function.

In a possible implementation, the communication apparatus 70 is configured to perform the method in the embodiment corresponding to FIG. 2A or FIG. 3. Specifically, in the communication apparatus 70, the transceiver 703 is configured to send first indication information, where the first indication information indicates a first time-frequency resource set, and the first time-frequency resource set and a second time-frequency resource set are used to transmit first control information to a terminal device in a non-connected state. In addition, the transceiver 703 is further configured to send the first control information on each of the first time-frequency resource set and the second time-frequency resource set.

In an optional implementation, the first control information is used to schedule a system information block SIB 1; or the first control information is control information scrambled by a system information radio network temporary identifier SI-RNTI.

In an optional implementation, the first indication information indicates a time domain position of the first time-frequency resource set.

In an optional implementation, the first indication information and an index value of a first synchronization signal block SSB are used to determine the time domain position of the first time-frequency resource set, and both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set. The transceiver 703 is further configured to send second indication information, where the second indication information indicates the time domain position of the second time-frequency resource set, the second indication information and the index value of the first SSB are used to determine the time domain position of the second time-frequency resource set, and the first indication information and the time domain position of the second time-frequency resource set are used to determine the time domain position of the first time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

In another possible implementation, the communication apparatus 70 is configured to perform the method in the embodiment corresponding to FIG. 2B or FIG. 5.

Specifically, in the communication apparatus 70, the transceiver 703 is configured to send the first indication information, where the first indication information indicates whether repeated transmission of the first control information exists. The transceiver 703 is further configured to: when the first indication information indicates that repeated transmission of the first control information exists, send the first control information on each of the first time-frequency resource set and the second time-frequency resource set. The time domain position of the first time-frequency resource set and the time domain position of the second time-frequency resource set are determined based on a first table.

In an optional implementation, the first control information is used to schedule a system information block SIB 1; or the first control information is control information scrambled by a system information radio network temporary identifier SI-RNTI.

In an optional implementation, the first indication information is located in a first message, the first message further includes a master information block MIB carrying second indication information, and the second indication information indicates the time domain position of the second time-frequency resource set. The second indication information, an index value of a first synchronization signal block SSB, and the first table are used to determine the time domain position of the first time-frequency resource set and the time domain position of the second time-frequency resource set.

In an optional implementation, the first table includes an index value of a first symbol in a monitoring window of the first time-frequency resource set and an index value of a first symbol in a monitoring window of the second time-frequency resource set.

In an optional implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In an optional implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 & $N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

For others, refer to the method of the network device in the foregoing embodiments. Details are not described herein again.

Figure 8:
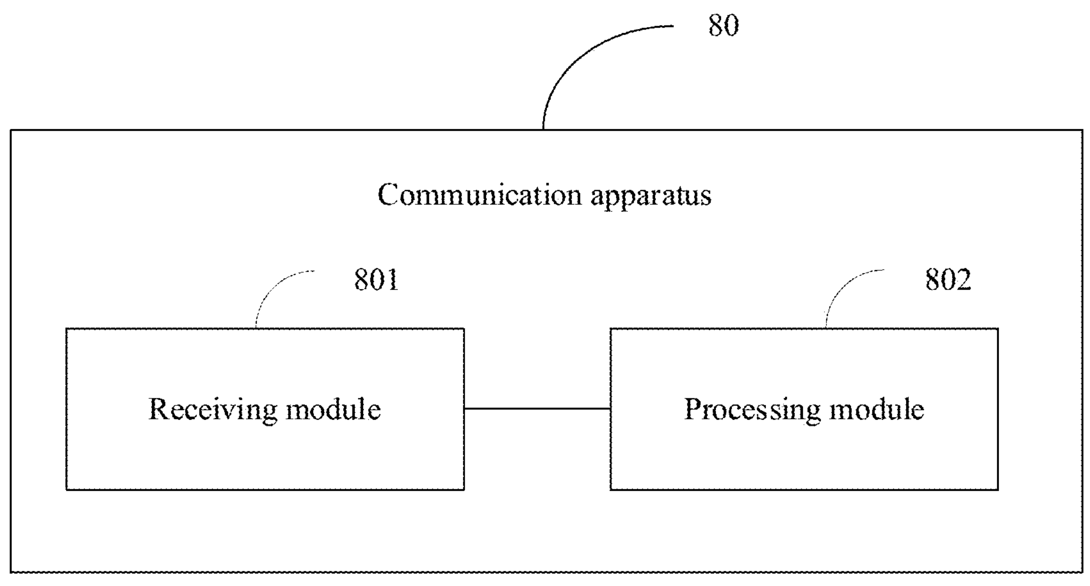
FIG. 8 is a schematic diagram of another embodiment of a communication apparatus according to this application.

As shown in FIG. 8, this application further provides another communication apparatus 80. The communication apparatus 80 may be a terminal device or a chip in the terminal device. The communication apparatus 80 includes a receiving module 801 and a processing module 802.

In a possible implementation, the communication apparatus 80 is configured to perform the method in the embodiment corresponding to FIG. 2A or FIG. 3. The receiving module 801 is configured to receive first indication information from a network device before the communication apparatus 80 is in a connected state, where the first indication information indicates a first time-frequency resource set, and the first time-frequency resource set and a second time-frequency resource set are used to transmit first control information. The processing module 802 is configured to determine a time domain position of the first time-frequency resource set based on the first indication information. In addition, the receiving module 801 is further configured to receive the first control information on each of the first time-frequency resource set and the second time-frequency resource set before being in the connected state. Optionally, the first control information is used to schedule a system information block SIB 1; or the first control information is control information scrambled by a system information radio network temporary identifier SI-RNTI.

In an optional implementation, the first indication information indicates a time domain position of the first time-frequency resource set. The receiving module 801 is further configured to determine the time domain position of the first time-frequency resource set based on the first indication information.

In an optional implementation, the processing module 802 in the communication apparatus 80 is configured to determine the time domain position of the first time-frequency resource set based on the first indication information and an index value of a first synchronization signal block SSB, where both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set. The processing module 802 is specifically configured to: determine the time domain position of the second time-frequency resource set based on second indication information and the index value of the first SSB, where the second indication information indicates the time domain position of the second time-frequency resource set; and determine the time domain position of the first time-frequency resource set based on the first indication information and the time domain position of the second time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

In a possible implementation, the communication apparatus 80 is configured to perform the method in the embodiment corresponding to FIG. 2B or FIG. 5. In this case, the receiving module 801 in the communication apparatus 80 is configured to receive the first indication information before the communication apparatus 80 is in the connected state, where the first indication information indicates whether repeated transmission of the first control information exists. The processing module 802 is configured to: determine, based on the first indication information, whether repeated transmission of the first control information exists; and when the first indication information indicates that repeated transmission of the first control information exists, determine the time domain position of the first time-frequency resource set and the time domain position of the second time-frequency resource set based on a first table. The receiving module 801 in the communication apparatus 80 is further configured to receive the first control information on each of the first time-frequency resource set and the second time-frequency resource set before the communication apparatus 80 is in the connected state.

In a possible implementation, the first control information is used to schedule a system information block SIB 1; or the first control information is control information scrambled by a system information radio network temporary identifier SI-RNTI.

In a possible implementation, the first indication information is located in a first message, the first message further includes a master information block MIB carrying second indication information, and the second indication information indicates the time domain position of the second time-frequency resource set. The processing module 802 is specifically configured to determine the time domain position of the first time-frequency resource set and the time domain position of the second time-frequency resource set based on the second indication information, an index value of a first synchronization signal block SSB, and the first table.

In a possible implementation, the first table includes an index value of a first symbol in a monitoring window of the first time-frequency resource set and an index value of a first symbol in a monitoring window of the second time-frequency resource set.

In a possible implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In a possible implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 & $N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

For others, refer to the method of the terminal device in the foregoing embodiments. Details are not described herein again.

Figure 9:
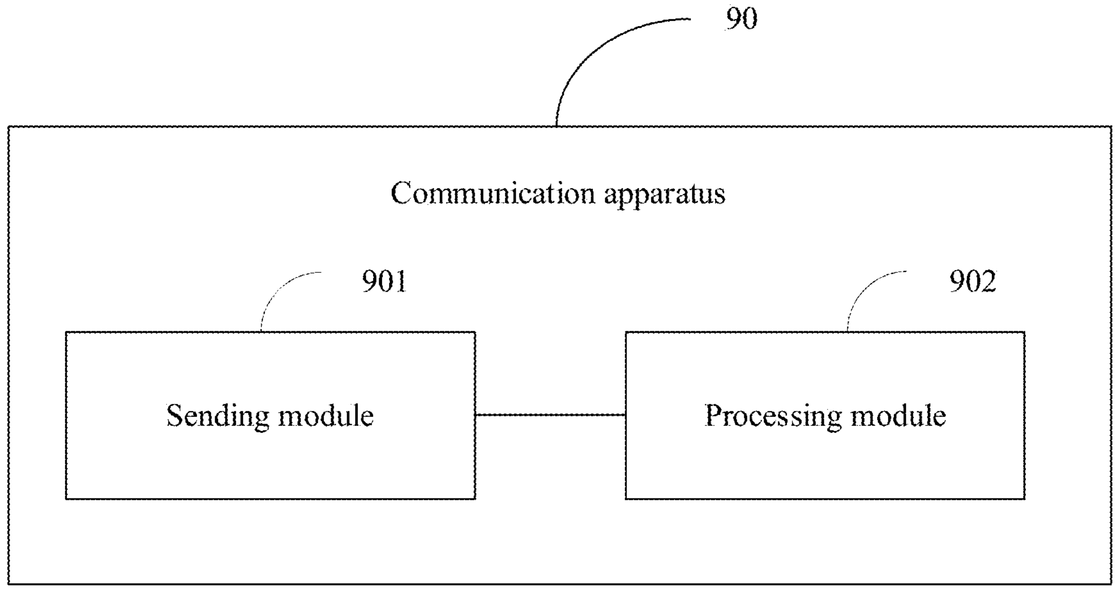
FIG. 9 is a schematic diagram of another embodiment of a communication apparatus according to this application.

As shown in FIG. 9, this application further provides another communication apparatus 90. The communication apparatus 90 may be a network device or a chip in the network device. Optionally, the network device is an access network device. The communication apparatus 90 includes a sending module 901 and a processing module 902.

In a possible implementation, the communication apparatus 90 is configured to perform the method in the embodiment corresponding to FIG. 2A or FIG. 3. Specifically, in the communication apparatus 90, the sending module 902 is configured to: determine a time-frequency domain position of a first time-frequency resource, and determine first indication information indicating the time-frequency domain position of the first time-frequency resource. In addition, the sending module 901 is configured to send the first indication information, where the first indication information indicates a first time-frequency resource set, and the first time-frequency resource set and a second time-frequency resource set are used to transmit first control information to a terminal device in a non-connected state. In addition, the sending module 901 is further configured to send the first control information on each of the first time-frequency resource set and the second time-frequency resource set.

In an optional implementation, the first control information is used to schedule a system information block SIB 1; or the first control information is control information scrambled by a system information radio network temporary identifier SI-RNTI.

In an optional implementation, the first indication information indicates a time domain position of the first time-frequency resource set.

In an optional implementation, the first indication information and an index value of a first synchronization signal block SSB are used to determine the time domain position of the first time-frequency resource set, and both the time domain position of the first time-frequency resource set and a time domain position of the second time-frequency resource set are related to the index value of the first SSB.

In an optional implementation, the first indication information includes a first association relationship, and the first association relationship indicates an association relationship between the time domain position of the first time-frequency resource set and the time domain position of the second time-frequency resource set. The sending module 901 is further configured to send second indication information, where the second indication information indicates the time domain position of the second time-frequency resource set, the second indication information and the index value of the first SSB are used to determine the time domain position of the second time-frequency resource set, and the first indication information and the time domain position of the second time-frequency resource set are used to determine the time domain position of the first time-frequency resource set.

In an optional implementation, the first time-frequency resource set and the second time-frequency resource set are located in a same slot in time domain.

In an optional implementation, the first time-frequency resource set and the second time-frequency resource set are respectively located on consecutive and different symbols in the slot in the time domain.

In an optional implementation, the first time-frequency resource set and the second time-frequency resource set are respectively located in different slots in time domain.

In an optional implementation, an index value of a symbol in a slot in which the first time-frequency resource set is located is the same as an index value of a symbol in a slot in which the second time-frequency resource set is located.

In an optional implementation, the slot in which the first time-frequency resource set is located is before the slot in which the second time-frequency resource set is located.

In another possible implementation, the communication apparatus 90 is configured to perform the method in the embodiment corresponding to FIG. 2B or FIG. 5. Specifically, in the communication apparatus 90, the processing module 902 is configured to: determine whether the first control information needs to be repeatedly transmitted, and determine the first indication information based on a decision result indicating whether the first control information needs to be repeatedly transmitted. The sending module 901 is configured to send first indication information, where the first indication information indicates whether repeated transmission of the first control information exists. The sending module 901 is further configured to: when the first indication information indicates that repeated transmission of the first control information exists, send the first control information on each of the first time-frequency resource set and the second time-frequency resource set. The time domain position of the first time-frequency resource set and the time domain position of the second time-frequency resource set are determined based on a first table.

In an optional implementation, the first control information is used to schedule a system information block SIB 1; or the first control information is control information scrambled by a system information radio network temporary identifier SI-RNTI.

In an optional implementation, the first indication information is located in a first message, the first message further includes a master information block MIB carrying second indication information, and the second indication information indicates the time domain position of the second time-frequency resource set. The second indication information, an index value of a first synchronization signal block SSB, and the first table are used to determine the time domain position of the first time-frequency resource set and the time domain position of the second time-frequency resource set.

In an optional implementation, the first table includes an index value of a first symbol in a monitoring window of the first time-frequency resource set and an index value of a first symbol in a monitoring window of the second time-frequency resource set.

In an optional implementation, the first table further includes a first index value determined based on the second indication information, the first index value corresponds to the index value of the first symbol in the monitoring window of the first time-frequency resource set, and the first index value corresponds to the index value of the first symbol in the monitoring window of the second time-frequency resource set.

In an optional implementation, the first table includes:

| First index value determined based on the second indication information | O | Quantity of slots in each search space set | M | Index value of the first symbol in the monitoring window |
|---|---|---|---|---|
| 0 | 0 | 1 | 1 | 0 & $N_{symb}^{CORESET}$ |

The index value of the first symbol in the monitoring window of the second time-frequency resource set is 0, the index value of the first symbol in the monitoring window of the first time-frequency resource set is $$N_{symb}^{CORESET},$$

O indicates a starting position of a monitoring window of the first SSB, and M indicates a degree of overlap between the monitoring window of the first SSB and a monitoring window of an adjacent SSB.

For others, refer to the method of the network device in the foregoing embodiments. Details are not described herein again.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein. It should be further understood that "first", "second", "third", "fourth", and various numbers in this specification are merely used for differentiation for ease of description, and are not intended to limit the scope of embodiments of this application.

In addition, this application provides a computer program product. The computer program product includes one or more computer instructions. When the computer program instructions are loaded and executed on the computer, the procedures or functions according to embodiments of this application are all or partially generated. For example, the method related to the network device in FIG. 2A, FIG. 2B, FIG. 3, and FIG. 5 is implemented. For another example, the method related to the terminal device in FIG. 2A, FIG. 2B, FIG. 3, and FIG. 5 is implemented. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In addition, this application further provides a computer-readable storage medium. The storage medium stores a computer program, and the computer program is executed by a processor to implement the methods related to the terminal device in FIG. 2A, FIG. 2B, FIG. 3, and FIG. 5.

In addition, this application further provides a computer-readable storage medium. The storage medium stores a computer program, and the computer program is executed by a processor to implement the methods related to the network device in FIG. 2A, FIG. 2B, FIG. 3, and FIG. 5.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, sequence numbers of the foregoing processes do not mean execution sequences. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing embodiments are merely intended for describing the technical solutions of this application instead of limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A control information receiving method, comprising:

receiving first indication information before a terminal device being in a connected state, wherein the first indication information indicates a time domain position of a first time-frequency resource set, and the first time-frequency resource set and a second time-frequency resource set are used to transmit first control information; and receiving the first control information on each of the first time-frequency resource set and the second time-frequency resource set before the terminal device being in the connected state;

wherein the control information receiving method further comprises:

determining the time domain position of the first time-frequency resource set based on the first indication information and an index value of a first synchronization signal block (SSB), wherein both the time domain position of the first time-frequency resource set and a time domain position of the second time-frequency resource set are related to the index value of the first SSB.

2. The control information receiving method according to claim 1, wherein the first control information is used to schedule a system information block (SIB) 1; or the first control information is control information scrambled by a system information radio network temporary identifier (SI-RNTI).

3. The control information receiving method according to claim 1, wherein the first indication information comprises a first association relationship, and the first association relationship indicates an association relationship between the time domain position of the first time-frequency resource set and the time domain position of the second time-frequency resource set; and the determining the time domain position of the first time-frequency resource set based on the first indication information and an index value of a first synchronization signal block (SSB) comprises:

determining the time domain position of the second time-frequency resource set based on second indication information and the index value of the first SSB, wherein the second indication information indicates the time domain position of the second time-frequency resource set; and determining the time domain position of the first time-frequency resource set based on the first indication information and the time domain position of the second time-frequency resource set.

4. The control information receiving method according to claim 1, wherein the first time-frequency resource set and the second time-frequency resource set are located in a same slot in time domain.

5. The control information receiving method according to claim 1, wherein the first time-frequency resource set and the second time-frequency resource set are respectively located in different slots in time domain.

6. A control information sending method, comprising:

sending first indication information, wherein the first indication information indicates a time domain position of a first time-frequency resource set, and the first time-frequency resource set and a second time-frequency resource set are used to transmit first control information to a terminal device in a non-connected state, wherein the first indication information and an index value of a first synchronization signal block (SSB) are used to determine the time domain position of the first time-frequency resource set, and both the time domain position of the first time-frequency resource set and a time domain position of the second time-frequency resource set are related to the index value of the first SSB; and sending the first control information on each of the first time-frequency resource set and the second time-frequency resource set.

7. The control information sending method according to claim 6, wherein the first control information is used to schedule a system information block (SIB) 1; or the first control information is control information scrambled by a system information radio network temporary identifier (SI-RNTI).

8. The control information sending method according to claim 6, wherein the first indication information comprises a first association relationship, and the first association relationship indicates an association relationship between the time domain position of the first time-frequency resource set and the time domain position of the second time-frequency resource set; and the control information sending method further comprises:

sending second indication information, wherein the second indication information indicates the time domain position of the second time-frequency resource set, the second indication information and the index value of the first SSB are used to determine the time domain position of the second time-frequency resource set, and the first indication information and the time domain position of the second time-frequency resource set are used to determine the time domain position of the first time-frequency resource set.

9. The control information sending method according to claim 6, wherein the first time-frequency resource set and the second time-frequency resource set are located in a same slot in time domain.

10. The control information sending method according to claim 6, wherein the first time-frequency resource set and the second time-frequency resource set are respectively located in different slots in time domain.

11. A communication apparatus, comprising at least one processor and one or more memories coupled to the at least one processor, wherein the one or more memories store programming instructions for execution by the at least one processor to perform operations comprising:

receiving first indication information before a communication apparatus being in a connected state, wherein the first indication information indicates a time domain position of a first time-frequency resource set, and the first time-frequency resource set and a second time-frequency resource set are used to transmit first control information; and receiving the first control information on each of the first time-frequency resource set and the second time-frequency resource set before the communication apparatus being in the connected state;

wherein the control information receiving method further comprises:

determining the time domain position of the first time-frequency resource set based on the first indication information and an index value of a first synchronization signal block (SSB), wherein both the time domain position of the first time-frequency resource set and a time domain position of the second time-frequency resource set are related to the index value of the first SSB.

12. The communication apparatus according to claim 11, wherein the first control information is used to schedule a system information block (SIB) 1; or the first control information is control information scrambled by a system information radio network temporary identifier (SI-RNTI).

13. The communication apparatus according to claim 11, wherein the first indication information comprises a first association relationship, and the first association relationship indicates an association relationship between the time domain position of the first time-frequency resource set and the time domain position of the second time-frequency resource set; and the determining the time domain position of the first time-frequency resource set based on the first indication information and an index value of a first synchronization signal block (SSB) comprises:

determining the time domain position of the second time-frequency resource set based on second indication information and the index value of the first SSB, wherein the second indication information indicates the time domain position of the second time-frequency resource set; and determining the time domain position of the first time-frequency resource set based on the first indication information and the time domain position of the second time-frequency resource set.

14. The communication apparatus according to claim 11, wherein the first time-frequency resource set and the second time-frequency resource set are located in a same slot in time domain.

15. The communication apparatus according to claim 11, wherein the first time-frequency resource set and the second time-frequency resource set are respectively located in different slots in time domain.

16. A communication apparatus, comprising at least one processor and one or more memories coupled to the at least one processor, wherein the one or more memories store programming instructions for execution by the at least one processor to perform operations comprising:

sending first indication information, wherein the first indication information indicates a time domain position of a first time-frequency resource set, and the first time-frequency resource set and a second time-frequency resource set are used to transmit first control information to a terminal device in a non-connected state, wherein the first indication information and an index value of a first synchronization signal block (SSB) are used to determine the time domain position of the first time-frequency resource set, and both the time domain position of the first time-frequency resource set and a time domain position of the second time-frequency resource set are related to the index value of the first SSB; and sending the first control information on each of the first time-frequency resource set and the second time-frequency resource set.

17. The communication apparatus according to claim 16, wherein the first control information is used to schedule a system information block (SIB) 1; or the first control information is control information scrambled by a system information radio network temporary identifier (SI-RNTI).

18. The communication apparatus according to claim 16, wherein the first indication information comprises a first association relationship, and the first association relationship indicates an association relationship between the time domain position of the first time-frequency resource set and the time domain position of the second time-frequency resource set; and the one or more memories store the programming instructions for execution by the at least one processor to perform operations comprising:

sending second indication information, wherein the second indication information indicates the time domain position of the second time-frequency resource set, the second indication information and the index value of the first SSB are used to determine the time domain position of the second time-frequency resource set, and the first indication information and the time domain position of the second time-frequency resource set are used to determine the time domain position of the first time-frequency resource set.

19. The communication apparatus according to claim 16, wherein the first time-frequency resource set and the second time-frequency resource set are located in a same slot in time domain.

20. The communication apparatus according to claim 16, wherein the first time-frequency resource set and the second time-frequency resource set are respectively located in different slots in time domain.

* * * * *